United States Patent [19]
Fujita et al.

[11] Patent Number: 5,907,332

[45] Date of Patent: *May 25, 1999

[54] INK JET RECORDING APPARATUS AND METHOD CAPABLE OF PREVENTING INK BLURRING BY THINNING INK DOTS

[75] Inventors: Takayuki Fujita, Inagi; Masaya Kikuta, Tokyo; Tsutomu Yamazaki, Chigasaki, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/312,751

[22] Filed: Sep. 27, 1994

[30] Foreign Application Priority Data

| Sep. 28, 1993 | [JP] | Japan | 5-241382 |
| Oct. 20, 1993 | [JP] | Japan | 5-262375 |
| Sep. 22, 1994 | [JP] | Japan | 6-228372 |

[51] Int. Cl.$^6$ ............................................ B41J 2/01
[52] U.S. Cl. ............................... 347/15; 347/43; 358/298
[58] Field of Search ................................. 347/9, 12, 15, 347/41, 43; 358/298

[56] References Cited

U.S. PATENT DOCUMENTS

| 4,727,436 | 2/1988 | Kawamura et al. | 358/298 |
| 4,855,752 | 8/1989 | Bergstedt . | |

FOREIGN PATENT DOCUMENTS

| 0382023 | 8/1990 | European Pat. Off. . |
| 0390473 | 10/1990 | European Pat. Off. . |
| 0597714 | 5/1994 | European Pat. Off. . |

Primary Examiner—Benjamin R. Fuller
Assistant Examiner—Craig A. Hallacher
Attorney, Agent, or Firm—Fitzpatrick, Cella, Harper & Scinto

[57] ABSTRACT

To prevent an ink blurring on the recording medium, the ink jet recording apparatus for ejecting ink droplets onto the recording medium to record an image includes a plurality of recording heads, each having a plurality of ejecting ports and ejecting different inks; a data storage device for storing printing data and non-printing data for each of the recording heads; a boundary detector for detecting a boundary between the printing data and the non printing data of one of the recording heads in accordance with the printing data stored in the storage device; and a judging an adjusting device for judging whether printing data of other heads continues for more than a predetermined number of dots at the boundary detected by the boundary detector; and a thinning device for converting some of the printing data of the other heads to non printing data when the judging means determines that the printing data of the other heads continues for more than the predetermined number of dots.

22 Claims, 33 Drawing Sheets

DATA BEFORE THINNING PROCESS

DATA AFTER THINNING PROCESS

◯ NON INK EJECTING DATA
● INK EJECTING DATA

FIG.8

1 DOT DATA THINNING

DATA BEFORE
THINNING PROCESS
MAIN SCANNING DIRECTION →
Y
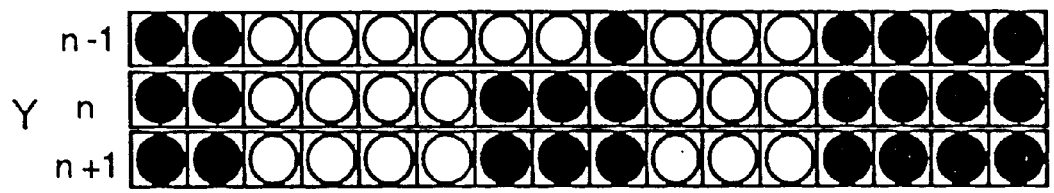
M
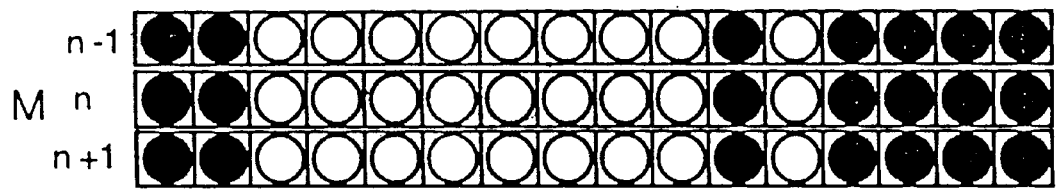
C
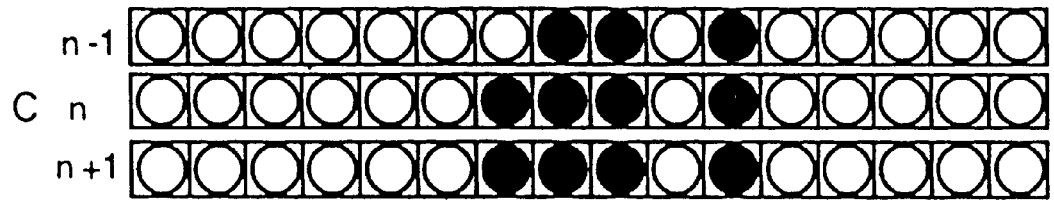
Bk n
*FIG.11A*

DATA AFTER
THINNING PROCESS
Y n 
M n 
C n 
Bk n 
*FIG.11B*

THINNING PROCESS BEING CARRIED OUT
ONLY WHEN A IS EQUAL TO ALL OF B

| COMPARISON COLOR A | COMPARISON COLOR B | PIXEL DATA | BOUNDARY LINE COORDINATE VALUE |
|---|---|---|---|
| YH | MH | Y | Y-COORDINATE VALUE GROUP OF BOUNDARY LINE BETWEEN Y AND M |
| | | M | M-COORDINATE VALUE GROUP OF BOUNDARY LINE BETWEEN Y AND M |
| | CH | Y | Y-COORDINATE VALUE GROUP OF BOUNDARY LINE BETWEEN Y AND C |
| | | C | C-COORDINATE VALUE GROUP OF BOUNDARY LINE BETWEEN Y AND C |
| | KH | Y | Y-COORDINATE VALUE GROUP OF BOUNDARY LINE BETWEEN Y AND K |
| | | K | K-COORDINATE VALUE GROUP OF BOUNDARY LINE BETWEEN Y AND K |
| MH | CH | M | M-COORDINATE VALUE GROUP OF BOUNDARY LINE BETWEEN M AND C |
| | | C | C-COORDINATE VALUE GROUP OF BOUNDARY LINE BETWEEN M AND C |
| | KH | M | M-COORDINATE VALUE GROUP OF BOUNDARY LINE BETWEEN M AND K |
| | | K | K-COORDINATE VALUE GROUP OF BOUNDARY LINE BETWEEN M AND K |
| CH | KH | C | C-COORDINATE VALUE GROUP OF BOUNDARY LINE BETWEEN C AND K |
| | | K | K-COORDINATE VALUE GROUP OF BOUNDARY LINE BETWEEN C AND K |

FIG.17

| COMPARISON COLOR A | COMPARISON COLOR B | PIXEL DATA | BOUNDARY LINE COORDINATE VALUE |
|---|---|---|---|
| YV | MV | Y | Y-COORDINATE VALUE GROUP OF BOUNDARY LINE BETWEEN Y AND M |
| | | M | M-COORDINATE VALUE GROUP OF BOUNDARY LINE BETWEEN Y AND M |
| | CV | Y | Y-COORDINATE VALUE GROUP OF BOUNDARY LINE BETWEEN Y AND C |
| | | C | C-COORDINATE VALUE GROUP OF BOUNDARY LINE BETWEEN Y AND C |
| | KV | Y | Y-COORDINATE VALUE GROUP OF BOUNDARY LINE BETWEEN Y AND K |
| | | K | K-COORDINATE VALUE GROUP OF BOUNDARY LINE BETWEEN Y AND K |
| MV | CV | M | M-COORDINATE VALUE GROUP OF BOUNDARY LINE BETWEEN M AND C |
| | | C | C-COORDINATE VALUE GROUP OF BOUNDARY LINE BETWEEN M AND C |
| | KV | M | M-COORDINATE VALUE GROUP OF BOUNDARY LINE BETWEEN M AND K |
| | | K | K-COORDINATE VALUE GROUP OF BOUNDARY LINE BETWEEN M AND K |
| CV | KV | C | C-COORDINATE VALUE GROUP OF BOUNDARY LINE BETWEEN C AND K |
| | | K | K-COORDINATE VALUE GROUP OF BOUNDARY LINE BETWEEN C AND K |

*FIG.18*

| COMPARISON COLOR A | COMPARISON COLOR B | PIXEL DATA | BOUNDARY LINE COORDINATE VALUE |
|---|---|---|---|
| Y | M | Y | Y-COORDINATE VALUE GROUP OF BOUNDARY LINE BETWEEN Y AND M |
| Y | M | M | M-COORDINATE VALUE GROUP OF BOUNDARY LINE BETWEEN Y AND M |
| Y | C | Y | Y-COORDINATE VALUE GROUP OF BOUNDARY LINE BETWEEN Y AND C |
| Y | C | C | C-COORDINATE VALUE GROUP OF BOUNDARY LINE BETWEEN Y AND C |
| Y | K | Y | Y-COORDINATE VALUE GROUP OF BOUNDARY LINE BETWEEN Y AND K |
| Y | K | K | K-COORDINATE VALUE GROUP OF BOUNDARY LINE BETWEEN Y AND K |
| M | C | M | M-COORDINATE VALUE GROUP OF BOUNDARY LINE BETWEEN M AND C |
| M | C | C | C-COORDINATE VALUE GROUP OF BOUNDARY LINE BETWEEN M AND C |
| M | K | M | M-COORDINATE VALUE GROUP OF BOUNDARY LINE BETWEEN M AND K |
| M | K | K | K-COORDINATE VALUE GROUP OF BOUNDARY LINE BETWEEN M AND K |
| C | K | C | C-COORDINATE VALUE GROUP OF BOUNDARY LINE BETWEEN C AND K |
| C | K | K | K-COORDINATE VALUE GROUP OF BOUNDARY LINE BETWEEN C AND K |

FIG.19

| COORDINATE VALUE | POSITIONAL INFORMATION | PIXEL NUMBER | BLOCK 1 |
|---|---|---|---|
| COORDINATE VALUE | POSITIONAL INFORMATION | PIXEL NUMBER | BLOCK 2 |
| ⋮ | ⋮ | ⋮ | |
| COORDINATE VALUE | POSITIONAL INFORMATION | PIXEL NUMBER | BLOCK n |

COORDINATE VALUE : COORDINATE VALUE OF BOUNDARY

POSITIONAL INFORMATION : POSITION OF BOUNDARY FOR COLOR BLOCK

0001B=LEFT SIDE
    0010B=RIGHT SIDE
    0100B=UPPER SIDE
    1000B=LOWER SIDE

PIXEL NUMBER : DOT NUMBER OF COLOR BLOCK

*FIG.20*

|     | x1 | x2 | x3 | x4 | x5 | x6 | x7 | x8 |
|-----|----|----|----|----|----|----|----|-----|
| y1  | C  | C  | C  | C  | C  | C  | C  | C  |
| y2  | M  | M  | M  | M  | M  | M  | C  | C  |
| y3  | M  | M  | M  | M  | M  | M  | C  | C  |
| y4  | M  | M  | M  | M  | M  | C  | C  | C  |
| y5  | M  | M  | M  | M  | M  | M  | C  | C  |
| y6  | M  | M  | M  | M  | M  | M  | C  | C  |
| y7  | M  | M  | M  | M  | M  | M  | C  | C  |
| y8  | C  | C  | C  | C  | C  | C  | C  | C  |

*FIG. 21A*

| COMPARISON COLOR A | COMPARISON COLOR B | PIXEL DATA | | | |
|---|---|---|---|---|---|
| MH | CH | M | | | |
| BLOCK 1 | | | BLOCK 2 | | |
| (x1,y2) | 0100B | 6 | (x2,y2) | 0100B | 6 |
| BLOCK 3 | | | BLOCK 4 | | |
| (x3,y2) | 0100B | 6 | (x4,y2) | 0100B | 6 |
| BLOCK 5 | | | BLOCK 6 | | |
| (x5,y2) | 0100B | 6 | (x6,y2) | 0110B | 2 |
| BLOCK 7 | | | BLOCK 8 | | |
| (x6,y3) | 1010B | 2 | (x5,y4) | 0010B | 5 |
| BLOCK 9 | | | BLOCK 10 | | |
| (x6,y5) | 0110B | 3 | (x6,y6) | 0010B | 6 |
| BLOCK 11 | | | BLOCK 12 | | |
| (x6,y7) | 1010B | 3 | (x5,y7) | 1000B | 6 |
| BLOCK 13 | | | BLOCK 14 | | |
| (x4,y7) | 1000B | 6 | (x3,y7) | 1000B | 6 |
| BLOCK 15 | | | BLOCK 16 | | |
| (x2,y7) | 1000B | 6 | (x1,y7) | 1000B | 6 |

|     | x1 | x2 | x3 | x4 | x5 | x6 | x7 | x8 |
|-----|----|----|----|----|----|----|----|----|
| y1  | C  | C  | C  | C  | C  | C  | C  | C  |
| y2  | M  | M  | M  | M  | M  | M  | C  | C  |
| y3  | M  | M  | M  | M  | M  | M  | C  | C  |
| y4  | M  | M  | M  | M  | M  | C  | C  | C  |
| y5  | M  | M  | M  | M  | M  | M  | C  | C  |
| y6  | M  | M  | M  | M  | M  | M  | C  | C  |
| y7  | M  | M  | M  | M  | M  | M  | C  | C  |
| y8  | C  | C  | C  | C  | C  | C  | C  | C  |

*FIG.23A*

| COMPARISON COLOR A | COMPARISON COLOR B | PIXEL DATA |
|---|---|---|
| MH | CH | M |
| BLOCK 1 | | BLOCK 2 | | |
| (x6,y2) | 0010B | (x6,y3) | 0010B | 6 |
| BLOCK 3 | | BLOCK 4 | | |
| (x5,y4) | 0010B | (x6,y5) | 0010B | 6 |
| BLOCK 5 | | BLOCK 6 | | |
| (x6,y6) | 0010B | (x6,y7) | 0010B | 6 |

| COMPARISON COLOR A | COMPARISON COLOR B | PIXEL DATA |
|---|---|---|
| MH | CH | C |
| BLOCK 1 | | BLOCK 2 | | |
| (x7,y2) | 0001B | (x7,y3) | 0001B | 2 |
| BLOCK 3 | | BLOCK 4 | | |
| (x6,y4) | 0001B | (x7,y5) | 0001B | 2 |
| BLOCK 5 | | BLOCK 6 | | |
| (x7,y6) | 0001B | (x7,y7) | 0001B | 2 |

*FIG. 23B*

|    | x1 | x2 | x3 | x4 | x5 | x6 | x7 | x8 |
|----|----|----|----|----|----|----|----|----|
| y1 | C  | C  | C  | C  | C  | C  | C  | C  |
| y2 | M  | M  | M  | M  | M  | M  | C  | C  |
| y3 | M  | M  | M  | M  | M  | M  | C  | C  |
| y4 | M  | M  | M  | M  | M  | C  | C  | C  |
| y5 | M  | M  | M  | M  | M  | M  | C  | C  |
| y6 | M  | M  | M  | M  | M  | M  | C  | C  |
| y7 | M  | M  | M  | M  | M  | M  | C  | C  |
| y8 | C  | C  | C  | C  | C  | C  | C  | C  |

*FIG. 24A*

| COMPARISON COLOR A | COMPARISON COLOR B | PIXEL DATA |
|---|---|---|
| MH | CH | M |

| BLOCK 1 | | | BLOCK 2 | | |
|---|---|---|---|---|---|
| (x1,y2) | 0100B | 6 | (x1,y7) | 1000B | 6 |
| BLOCK 3 | | | BLOCK 4 | | |
| (x2,y2) | 0100B | 6 | (x2,y7) | 1000B | 6 |
| BLOCK 5 | | | BLOCK 6 | | |
| (x3,y2) | 0100B | 6 | (x3,y7) | 1000B | 6 |
| BLOCK 7 | | | BLOCK 8 | | |
| (x4,y2) | 0100B | 6 | (x4,y7) | 1000B | 6 |
| BLOCK 9 | | | BLOCK 10 | | |
| (x5,y2) | 0100B | 6 | (x5,y7) | 1000B | 6 |
| BLOCK 11 | | | BLOCK 12 | | |
| (x6,y2) | 0100B | 2 | (x6,y3) | 1000B | 2 |
| BLOCK 13 | | | BLOCK 14 | | |
| (x6,y5) | 0100B | 3 | (x6,y7) | 1000B | 3 |

| COMPARISON COLOR A | COMPARISON COLOR B | PIXEL DATA |
|---|---|---|
| MH | CH | C |

| BLOCK 1 | | | BLOCK 2 | | |
|---|---|---|---|---|---|
| (x1,y1) | 0100B | 1 | (x1,y8) | 1000B | 1 |
| BLOCK 3 | | | BLOCK 4 | | |
| (x2,y1) | 0100B | 1 | (x2,y8) | 1000B | 1 |
| BLOCK 5 | | | BLOCK 6 | | |
| (x3,y1) | 0100B | 1 | (x3,y8) | 1000B | 1 |
| BLOCK 7 | | | BLOCK 8 | | |
| (x4,y1) | 0100B | 1 | (x4,y8) | 1000B | 1 |
| BLOCK 9 | | | BLOCK 10 | | |
| (x5,y1) | 0100B | 1 | (x5,y8) | 1000B | 1 |
| BLOCK 11 | | | BLOCK 12 | | |
| (x6,y1) | 0100B | 1 | (x6,y4) | 1100B | 1 |
| BLOCK 13 | | | | | |
| (x6,y8) | 1000B | 1 | | | |

*FIG.24B*

|     | x1 | x2 | x3 | x4 | x5 | x6 | x7 | x8 |
|-----|----|----|----|----|----|----|----|----|
| y1  | C  | C  | C  | C  | C  | C  | C  | C  |
| y2  | M  | M  | M  | M  | M  | M  | C  | C  |
| y3  | M  | M  | M  | M  | M  | M  | C  | C  |
| y4  | M  | M  | M  | M  | M  | C  | C  | C  |
| y5  | M  | M  | M  | M  | M  | M  | C  | C  |
| y6  | M  | M  | M  | M  | M  | M  | C  | C  |
| y7  | M  | M  | M  | M  | M  | M  | C  | C  |
| y8  | C  | C  | C  | C  | C  | C  | C  | C  |

| COMPARISON COLOR A | COMPARISON COLOR B | PIXEL DATA | | | |
|---|---|---|---|---|---|
| MH | CH | M | | | |
| BLOCK 1 | | | BLOCK 2 | | |
| (x1,y2) | 0100B | 6 | (x2,y2) | 0100B | 6 |
| BLOCK 3 | | | BLOCK 4 | | |
| (x3,y2) | 0100B | 6 | (x4,y2) | 0100B | 6 |
| BLOCK 5 | | | BLOCK 6 | | |
| (x5,y2) | 0100B | 6 | (x6,y2) | 0110B | 2 |
| BLOCK 7 | | | BLOCK 8 | | |
| (x6,y3) | 1010B | 2 | (x5,y4) | 0010B | 5 |
| BLOCK 9 | | | BLOCK 10 | | |
| (x6,y5) | 0110B | 3 | (x6,y6) | 0010B | 6 |
| BLOCK 11 | | | BLOCK 12 | | |
| (x6,y7) | 1010B | 3 | (x5,y7) | 1000B | 6 |
| BLOCK 13 | | | BLOCK 14 | | |
| (x4,y7) | 1000B | 6 | (x3,y7) | 1000B | 6 |
| BLOCK 15 | | | BLOCK 16 | | |
| (x2,y7) | 1000B | 6 | (x1,y7) | 1000B | 6 |

| COMPARISON COLOR A | COMPARISON COLOR B | PIXEL DATA | | | |
|---|---|---|---|---|---|
| MH | CH | C | | | |
| BLOCK 1 | | | BLOCK 2 | | |
| (x1,y1) | 0100B | 1 | (x2,y1) | 0100B | 1 |
| BLOCK 3 | | | BLOCK 4 | | |
| (x3,y1) | 0100B | 1 | (x4,y1) | 0100B | 1 |
| BLOCK 5 | | | BLOCK 6 | | |
| (x5,y1) | 0100B | 1 | (x6,y1) | 0110B | 1 |
| BLOCK 7 | | | BLOCK 8 | | |
| (x7,y2) | 0101B | 2 | (x7,y3) | 0101B | 2 |
| BLOCK 9 | | | BLOCK 10 | | |
| (x6,y4) | 1101B | 1 | (x7,y5) | 0001B | 2 |
| BLOCK 11 | | | BLOCK 12 | | |
| (x7,y6) | 0001B | 2 | (x7,y7) | 1001B | 2 |
| BLOCK 13 | | | BLOCK 14 | | |
| (x6,y8) | 1000B | 1 | (x5,y8) | 1000B | 1 |
| BLOCK 15 | | | BLOCK 16 | | |
| (x4,y8) | 1000B | 1 | (x3,y8) | 1000B | 1 |
| BLOCK 17 | | | BLOCK 18 | | |
| (x2,y8) | 1000B | 1 | (x1,y8) | 1000B | 1 |

BOUNDARY

THINNING PROCESS BEING CARRIED OUT
ONLY WHEN A IS EQUAL TO ALL OF B

INK JET RECORDING APPARATUS AND METHOD CAPABLE OF PREVENTING INK BLURRING BY THINNING INK DOTS

BACKGROUND OF THE INVENTION

1. Field of the Invention

The present invention generally relates to an ink jet recording apparatus using an ink jet recording head. More specifically, the present invention is directed to an ink jet recording apparatus capable of recording a color image on a recording medium without ink blurring by thinning the image by excluding some of ink dots.

2. Description of the Prior Art

A color ink jet recording apparatus ejects a plurality of ink droplets onto a recording medium to form a single pixel. A color image may be formed by varying the sort of ejecting ink. This conventional ink jet recording apparatus records on the recording medium at high speed using, for example, low viscosity ink (mainly containing water). Extremely high ink absorbing speed and absorbing capacity are required to the recording medium. Various sorts of coated paper for ink jet recording purposes have been developed which have thick ink absorbing layers. However, the ink absorbing speed and the absorbing capacity of this coated paper do not meet the requirements of the color recording using four different color inks. Accordingly, the ink blurs at the edge of the color, boundary among different colors, and high density area, so that printing sharpness is lowered and ink concentration happens to fluctuate.

On the other hand, in view of cost, curling, weights and so on, a recording medium with thin coat layer and a recording medium of plain paper are preferable. However, when a color image is recorded on such recording paper, the ink blurs conspicuously. The bleeding of ink occurs at the color mixture portion on the plain paper and the plain paper cockles. The quality of the image is debased by the contacts of the ink ejecting surface of the rcording heads with the paper while the heads are moving. Furthermore, the ink is offset by the paper transporting roller, so that the quality of the image is debased. A similar problem occurs on OHP film having low ink absorbing capacity. There are some problems, taking account of the properties of the recording head. The ink on the convex portion of the recording material is attached on the ink ejecting plane of the recording head, which cause no ink to be ejected from the ink ejecting ports. In addition, the water repellent effect of the ink ejecting plane would be weakened due to sliding between the convex portion and the recording head, so that the ink may be readily attached to the ink ejecting planes.

SUMMARY OF THE INVENTION

The present invention has been made in an attempt to solve the above-described problems, and therefore, has an object to provide an ink jet recording apparatus capable of realizing high-quality recording operation without any ink blurring even when various types of recording materials with low ink absorbing characteristics are used, for instance, plain paper, coated paper with a thin coat layer, and a recording medium for an OHP film.

Another object of the present invention is to provide an ink jet recording apparatus capable of recording color image on a recording medium without any color ink blurring.

With the above-described elements, when a number of dots adjacent to another color dot being greater than a predetermined number, either ink dot is thinned, or pulled out.

Also, the ink dots of one color and other colors bordering on the one color are alternately thinned, or pulled out, so that the color blurring can be mitigated. In addition, a smooth boundary portion may be obtained, as compared with such a case that all ink dots at the boundary are not ejected.

In the first aspect of the present invention, an ink jet recording apparatus for ejecting ink droplets onto a recording medium to record an image comprises:

a plurality of recording heads, each having a plurality of ejecting ports and ejecting different inks;

data storage means for storing printing data and non printing data for each of the recording heads;

boundary detecting means for detecting a boundary between the printing data and the non printing data of one of the recording heads in accordance with the printing data stored in the storage means;

judging means for judging whether printing data of other heads continues for more than a predetermined number of dots at the boundary detected by the boundary detecting means; and thinning means for converting some of the printing data of the other heads to non printing data when the judging means determines that the printing data of the other heads continues for more than the predetermined number of dots.

Here, an ink jet recording apparatus may further comprise:

head moving means for moving the recording heads along a main scanning direction; and recording medium shifting means for shifting the recording medium along a sub-scanning direction;

in which the thinning means converts some of the printing data to the non printing data when the printing data of the other heads continues for more than two dots along the main scanning direction.

An ink jet recording apparatus may further comprise:

head moving means for moving the recording heads along a main scanning direction; and recording medium shifting means for shifting the recording medium along a sub-scanning direction;

wherein the thinning means converts some of the printing data to the non printing data when the printing data of the other heads continues for more than two dots along the sub-scanning direction.

An ink jet recording apparatus may further comprise:

head moving means for moving the recording heads along a main scanning direction; and recording medium shifting means for shifting the recording medium along a sub-scanning direction;

in which the thinning means converts some of the printing data to non printing data when the printing data of the other heads continues for more than two dots along the main scanning direction and along the sub-scanning direction.

In the second aspect of the present invention, an ink jet recording apparatus for ejecting ink droplets onto a recording medium to record an image comprises:

a plurality of recording heads each having a plurality of ejecting ports and ejecting different color inks;

data storage means for storing printing data and non printing data of each of the different color inks;

boundary detecting means for detecting a boundary between one of the ink and other inks in accordance with the printing data stored in the storage means; and thinning means for converting some of the printing data of the one of the ink and the other inks at the boundary between the one of the ink and the other inks to non printing data.

The thinning means may convert some of the printing data of the one of the ink and the other inks to non printing data so that the one of the ink does not border on the other ink.

The thinning means may convert the printing data of the one of the ink and the other inks at the boundary between the one of the ink and the other inks to non printing data alternately.

In the third aspect of the present invention, an ink jet recording method for an ink jet recording apparatus including a plurality of recording heads each having a plurality of ejecting ports and ejecting different inks onto a recording medium to record an image comprises the steps of:

storing printing data and non printing data for each of the recording heads to a data storage means;

detecting a boundary between the printing data and non printing data of one of the recording heads in accordance with the printing data stored in the storage means;

judging whether printing data of other heads continues for more than predetermined number at the boundary detected in the detecting step; and thinning the image by converting some of the printing data of the other heads to non printing data when the printing data of the other heads continues for more than predetermined number.

Here, an ink jet recording method may further comprise the steps of:

moving the recording heads along a main scanning direction; and shifting the recording medium along a sub-scanning direction;

in which the thinning step converts some of the printing data to the non printing data when the printing data of the other heads continues for more than two dots along the main scanning direction.

An ink jet recording method may further comprise the steps of:

moving the recording heads along a main scanning direction; and shifting the recording medium along a sub-scanning direction;

in which the thinning step converts some of the printing data to the non printing data when the printing data of the other heads continues for more than two dots along the sub-scanning direction.

An ink jet recording method may further comprise the steps of:

moving the recording heads along a main scanning direction; and shifting the recording medium along a sub-scanning direction;

in which the thinning step converts some of the printing data to non printing data when the printing data of the other heads continues for more than two dots along the main scanning direction and along the sub-scanning direction.

In the fourth aspect of the present invention, an ink jet recording method for an ink jet recording apparatus including a plurality of recording heads each having a plurality of ejecting ports and ejecting different color inks onto a recording medium to record an image comprises the steps of:

storing printing data and non printing data of each of the different color inks to a storage means;

detecting a boundary between one of the ink and other inks in accordance with the printing data stored in the storage means; and thinning the image by converting some of the printing data of the one of the ink and the other inks at the boundary between the one of the ink and the other inks to non printing data.

The thinning step may convert some of the printing data of the one of the ink and the other inks to non printing data so that the one of the ink does not border on the other inks.

The thinning step may convert the printing data of the one of the ink and the other inks at the boundary between the one of the ink and the other inks to non printing data alternately.

In the fifth aspect of the present-invention, an ink jet recorded product comprises:

ink dots of a plurality of colors arranged in matrix thereon;

in which at the boundary of dots of one ink, other inks are thinned by excluding some dots of the ink so that the other inks do not continue for more than predetermined number of the dots.

The other inks may be thinned by excluding some dots of the ink so that the other inks do not continue for more than two dots in predetermined direction of the matrix at the boundary of the one ink.

The other inks may be thinned by excluding some dots of the ink so that the other inks do not continue for more than two dots in any direction of the matrix at the boundary of the one ink.

In the sixth aspect of the present invention, an ink jet recorded product comprises:

ink dots of a plurality of colors arranged in matrix thereon;

in which some dots of one ink and other inks are excluded at the boundary between the one of the ink and the other inks.

Some dots of the one ink and the other inks may be excluded so that the one ink does not border on the the other inks in the matrix.

Dots of the one ink and the other inks may be excluded alternately along the boundary.

Each of the recording heads may generate bubbles in its ink by thermal energy and may eject the ink by a growth of the bubble.

In the seventh aspect of the present invention, an ink jet recording method ejecting different inks onto a recording medium according to image data to record a color image comprises:

the first step for detecting a boundary between a first color and a second color according to the image data;

the second step for judging whether printing data of the second color continues for plural pixels according to the image data;

the third step for processing the image data to thin the second color printing dots when the printing data of the second color is judged to continue for plural pixels in the second step; and the fourth step for printing the image on the recording medium according to the processed image data by ejecting the first and second color inks.

The above and other objects, effects, features and advantages of the present invention will become more apparent from the following description of the embodiment thereof taken in conjunction with the accompanying drawings.

BRIEF DESCRIPTION OF THE DRAWINGS

The above-described objects and other features of the present invention will now be explained in the following detailed description about the accompanying drawings, in which:

FIG. 8 is an explanatory diagram for explaining a main scanning direction and a sub-scanning direction for data executed in the color ink jet printer shown in FIG. 1;

FIGS. 11A and 11B schematically show results of process executed by the image processor shown in FIG. 10;

FIGS. 14A and 14B schematically indicate one example of an image forming pattern;

FIG. 17 schematically represents a boundary coordinate table along the main scanning direction, employed in the printer;

FIG. 18 schematically shows a boundary coordinate table along the sub-scanning direction, employed in the printer;

FIG. 19 schematically represents a boundary coordinate table employed in the printer;

FIG. 20 schematically indicates a data storage example of the boundary coordinate table employed in the printer;

FIGS. 21A and 21B schematically denote an example of an image forming pattern produced by the printer;

FIGS. 22A and 22B schematically show a data storage example of a boundary coordinate table;

FIGS. 23A and 23B schematically represent an example of an image forming pattern produced by a printer according to of the present invention;

FIGS. 24A and 24B schematically show an example of an image forming pattern;

FIGS. 25A and 25B schematically indicate another example of an image forming pattern; and FIGS. 26A and 26B schematically represent a data storage example of a boundary coordinate table.

DETAILED DESCRIPTION OF THE PREFERRED EMBODIMENTS

Referring to the accompanying drawings, various embodiments of an ink jet recording apparatus according to the present invention will be described in detail.

FIRST EMBODIMENT

Figure 1:
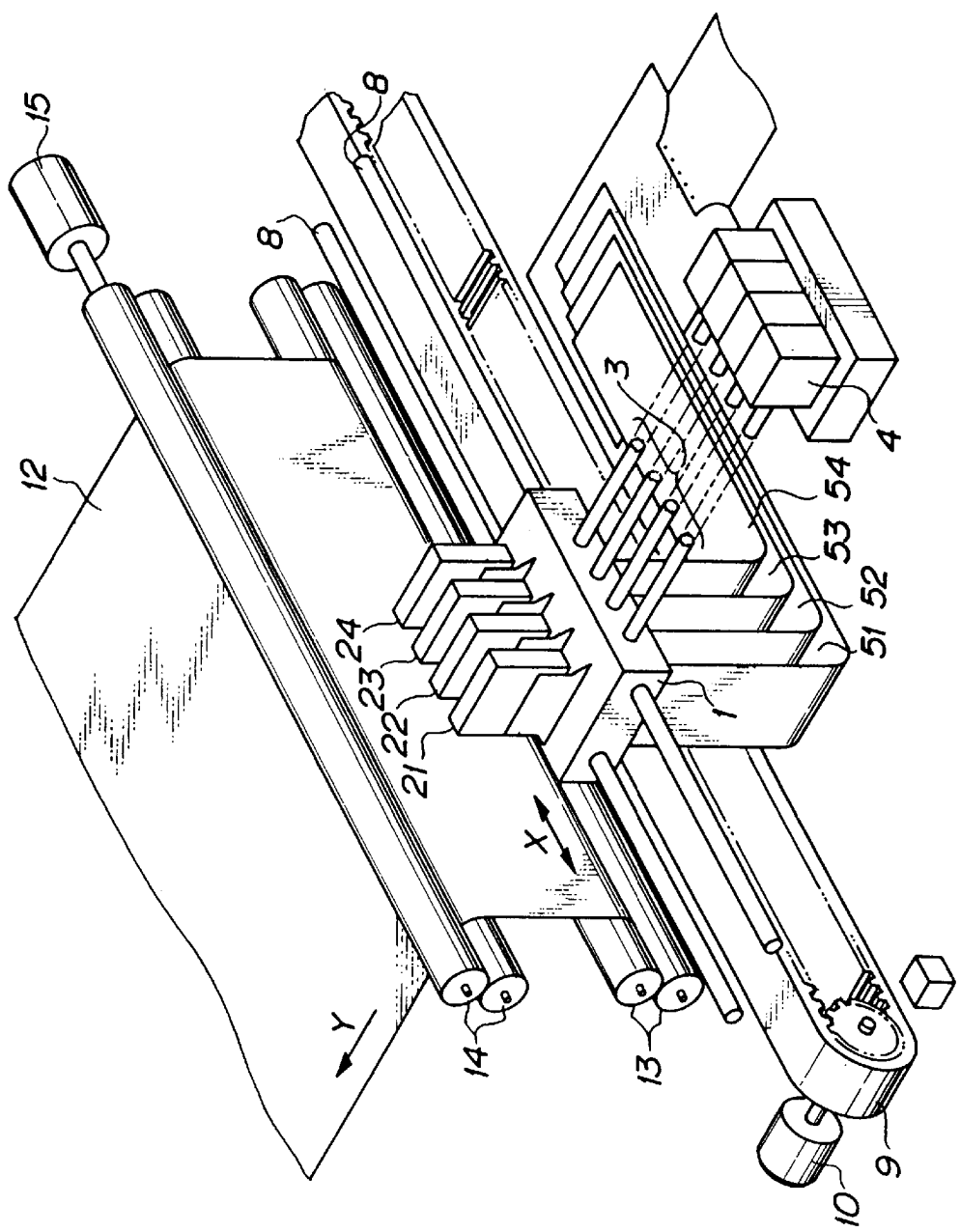
FIG. 1 is a perspective views of a major portion of a color ink jet printer according to the present invention.

FIG. 1 is a perspective view showing a printing mechanism unit of an ink jet. printer according to a first embodiment of the present invention. In FIG. 1, a plurality of recording heads 21 to 24 each of which has a multi-nozzle (e.g., 128 nozzles), are positioned on a carriage 1 in a parallel form. The recording head 21 ejects droplets of black (K) ink, the recording head 22 ejects droplets of yellow (Y) ink, the recording head 23 ejects droplets of magenta (M), and the recording head 24 ejects droplets of cyan (C). Different colors of ink are supplied from an ink tank 4 through a flexible pipe 3 to the corresponding recording heads 21 to 24.

Figure 2:
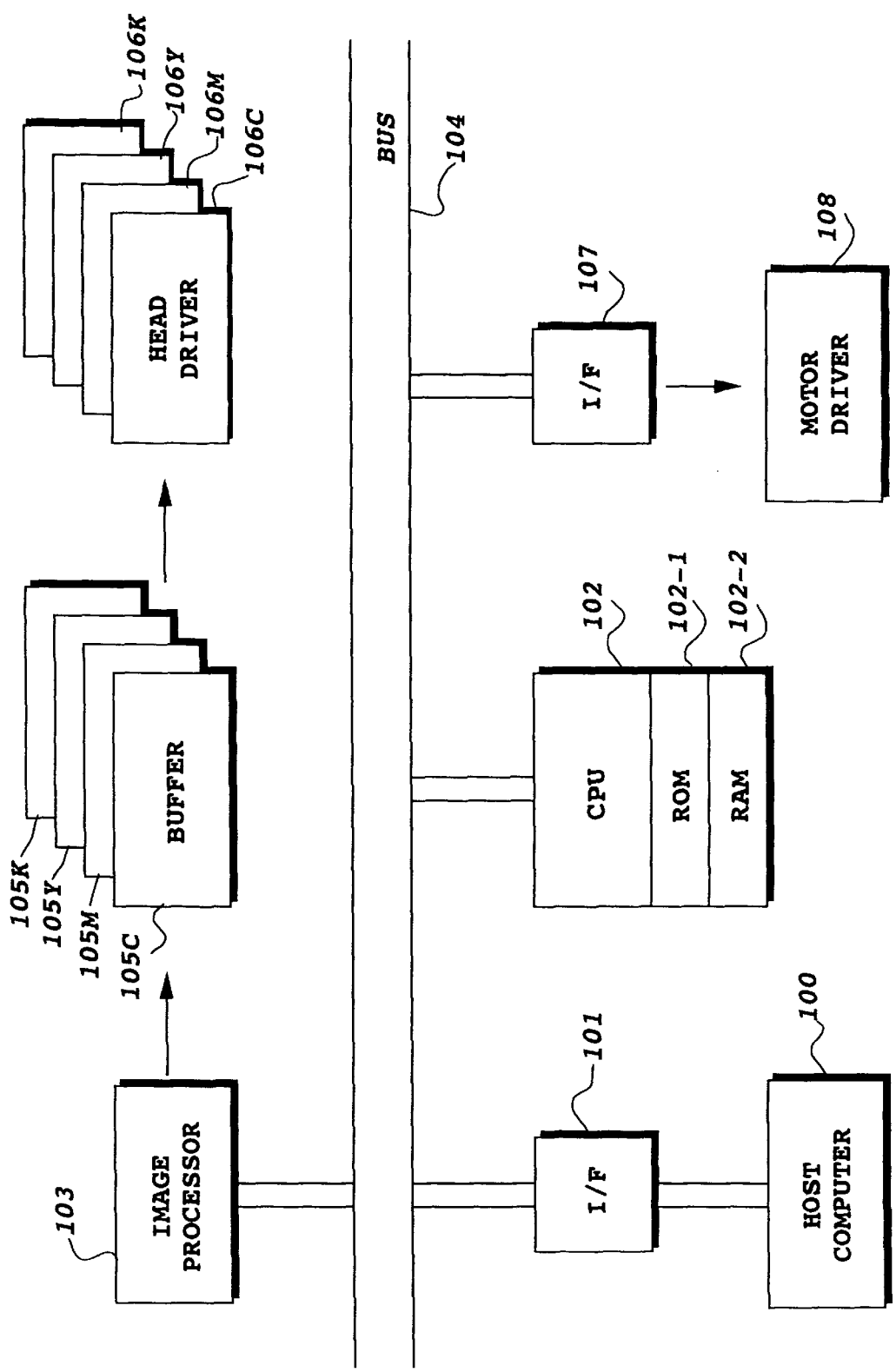
FIG. 2 is a schematic block diagram for representing a hardware arrangement of a control circuit employed in the color ink jet printer of FIG. 1.

Nozzle drive signals are furnished through flexible insulating belts 51 to 54 into which a plurality of conducting wires are embedded, to the respective recording heads 21 to 24. On the other hand, the carriage 1 is mounted on two guide rails 8, and is reciprocated along the x-direction by driving an endless belt 9 coupled to the carriage 1 by a pulse motor 10 to perform the main scanning operation. Recording paper 12 is extended by a pair of rollers 13 and 14. The recording paper 12 is transported by a pulse motor 15 coupled to one roller 14 along the y-direction perpendicular to the x-direction along the sub-scanning direction. Color images or characters may be recorded on the recording paper 12 with the above-described elements FIG. 2 schematically shows a hardware block diagram of a control unit employed in the above-described ink jet printer according to the first embodiment. In FIG. 2, the external host computer 100 transfers various sorts of instructions and recording data to this control unit. These recording data are, for example, various color data of cyan, magenta, yellow, and black, and character data. The input and output interface (I/F) 101 inputs the color data and various sorts of instruction sent from the host computer 100 to this control unit. The CPU (central processing unit) 102 controls overall operation of the control unit. The ROM (read-only memory) 102-1 previously stores a control program executed by the CPU 102. The image processor (I/P) 103 processes an image data under control of the CPU 102.

The buffer 105 temporarily stores various pixel data outputted from the image processor 103. The buffer 105C temporarily stores color data of cyan. The buffer 105M temporarily stores color data of magenta. The buffer 105Y temporarily stores color data of yellow. The buffer 105K temporarily stores color data of black. The head driver 106 drives the respective nozzles of the recording heads 21 to 24 according to the color data stored in the buffer 105. The motor driver 108 produces various drive signals to drive the carriage 1 and motors for transporting the recording paper. Through the input and output interface 107, the motor driver 108 drives the motor driver 108 in response to the control signal supplied from the CPU 102. Reference numeral 104 indicates a bus of the CPU 102.

Figure 3:
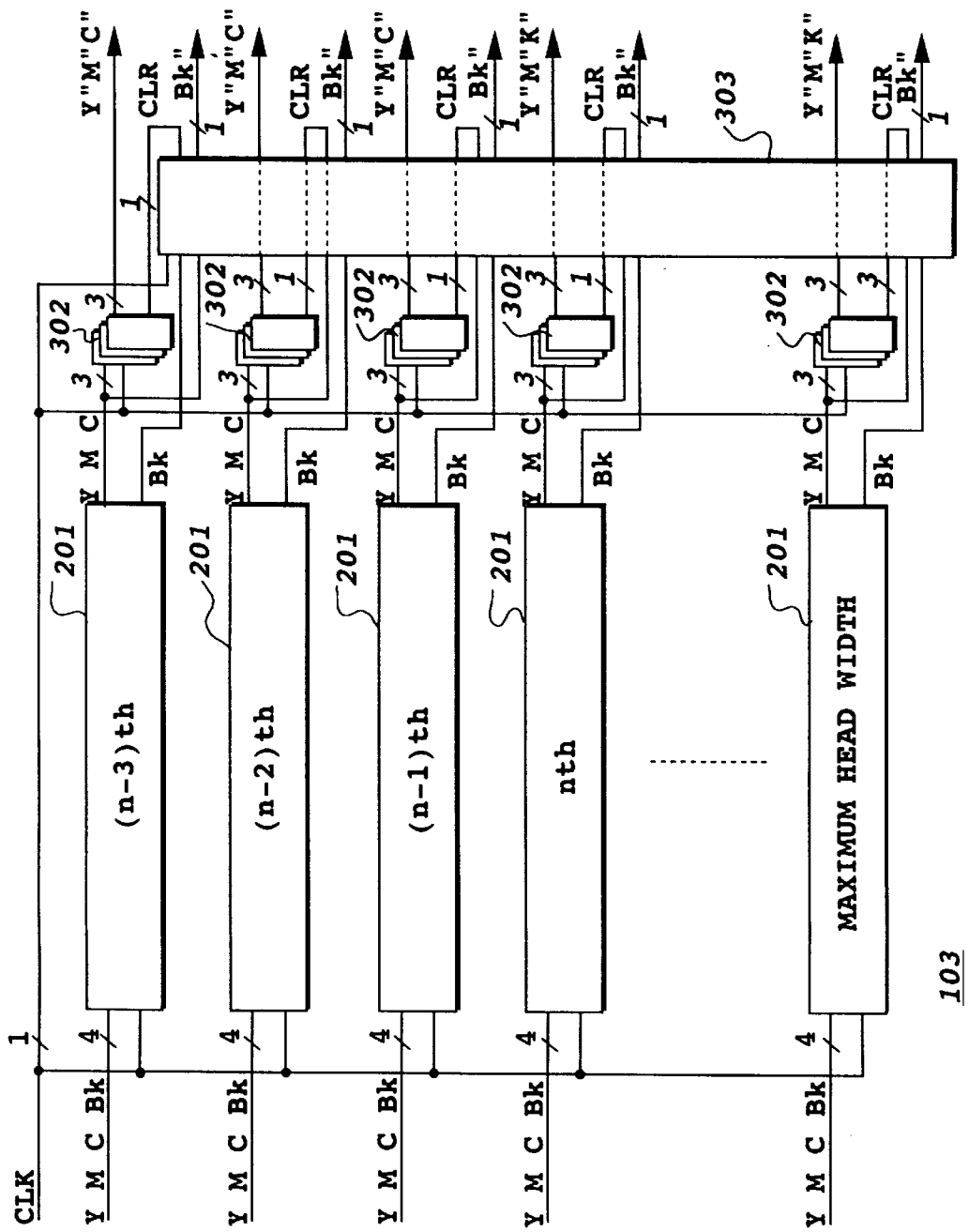
FIG. 3 is a schematic block diagram for indicating a partial circuit arrangement of the image processor shown in FIG. 2.

FIG. 3 shows the hardware structure of the image processor 102 shown in FIG. 2. In FIG. 3, thinning circuits 201 exclude some of ink dots data along the scanning direction of the recording heads. The thinning circuit 201 is provided for each ejection port. Data latches 302 store the data of each color outputted from the thinning circuits 201. Image processor 303 obtains ink dots data to be excluded along the sub-scanning direction based on the data outputted from the thinning circuits 201.

Figure 4:
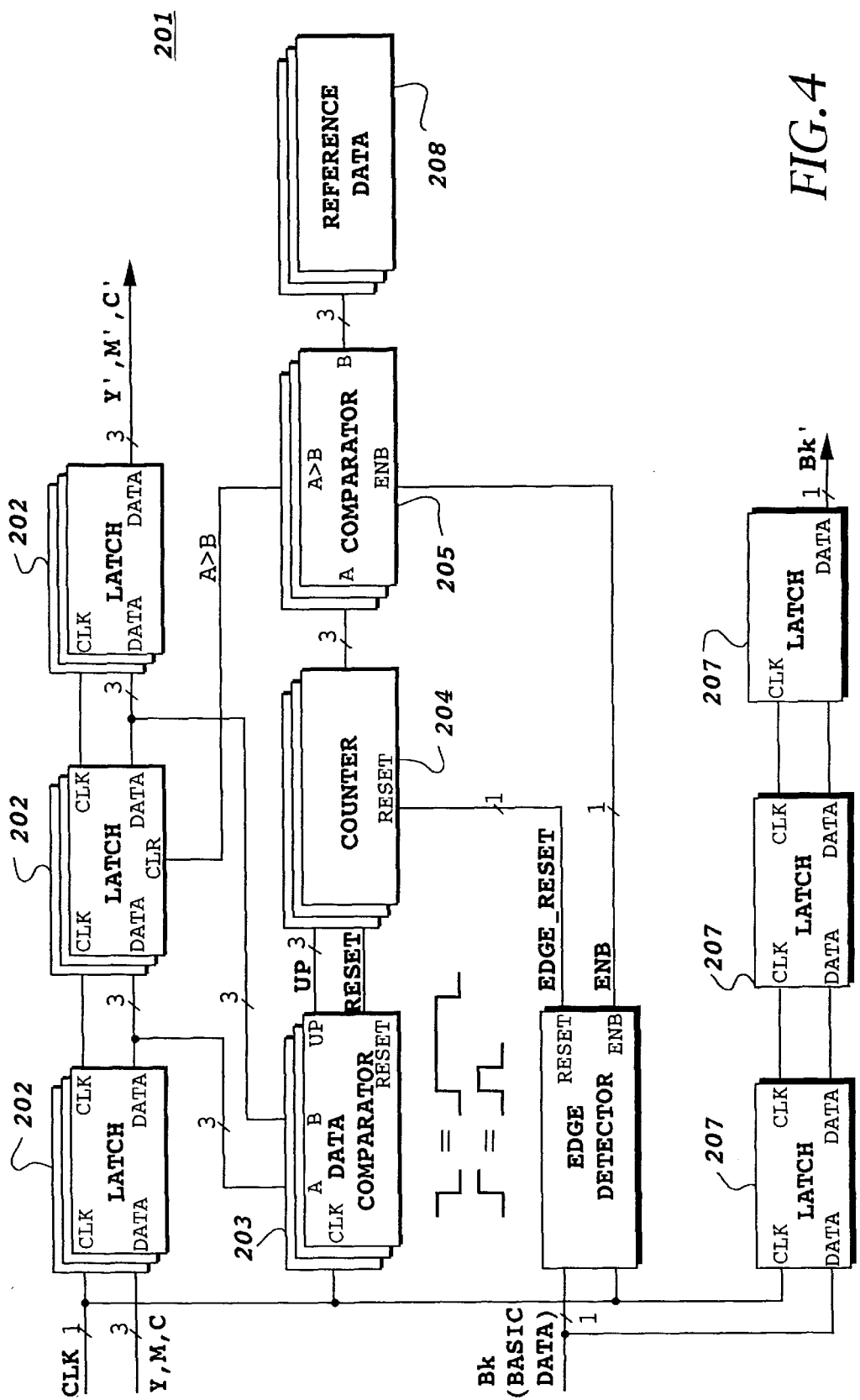
FIG. 4 is a schematic block diagram for showing a partial circuit arrangement of the image processor.
Figure 5:
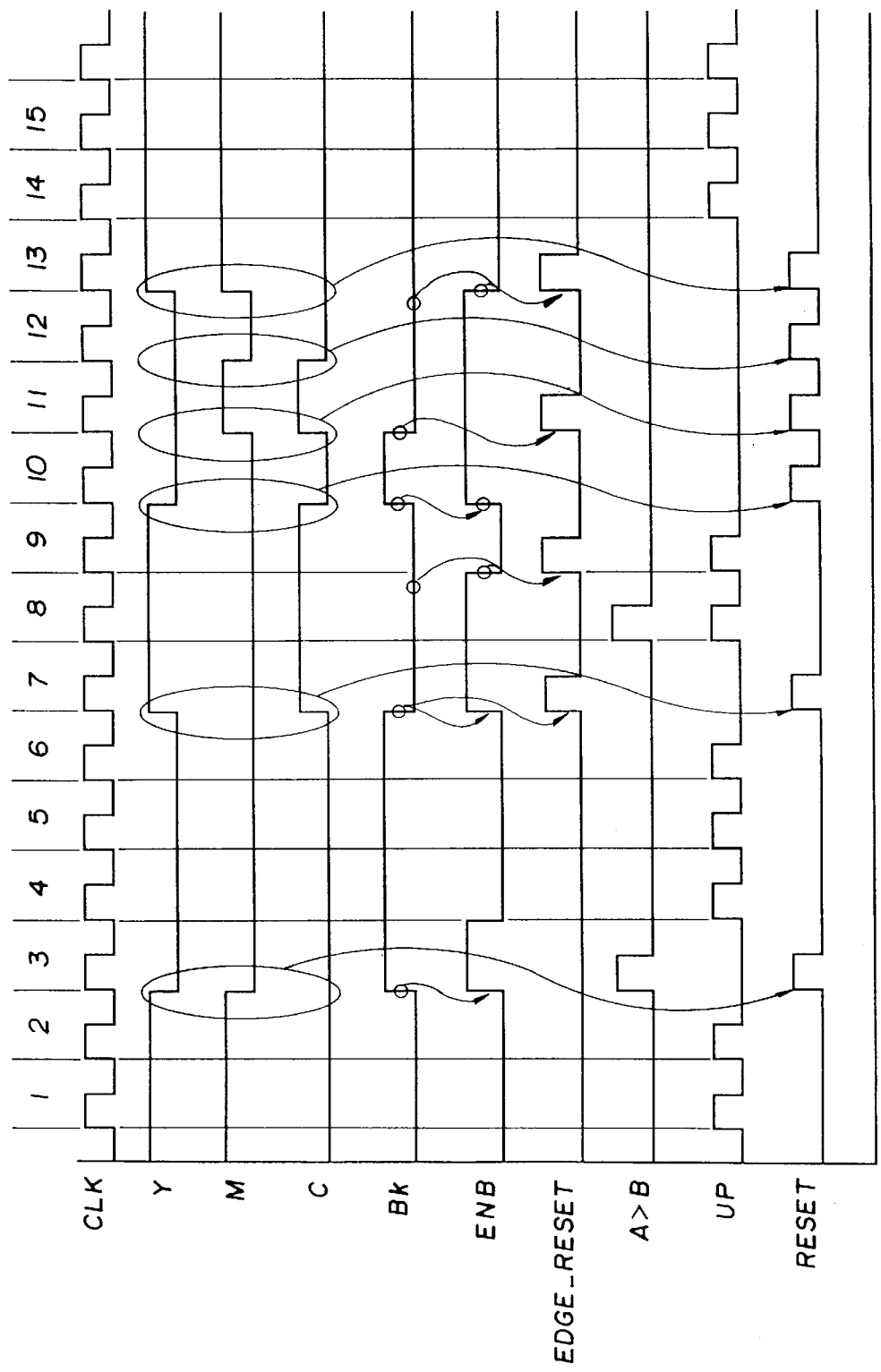
FIG. 5 is a circuit block diagram for showing in detail the data processing unit 303 of FIG. 4.
Figure 7A:
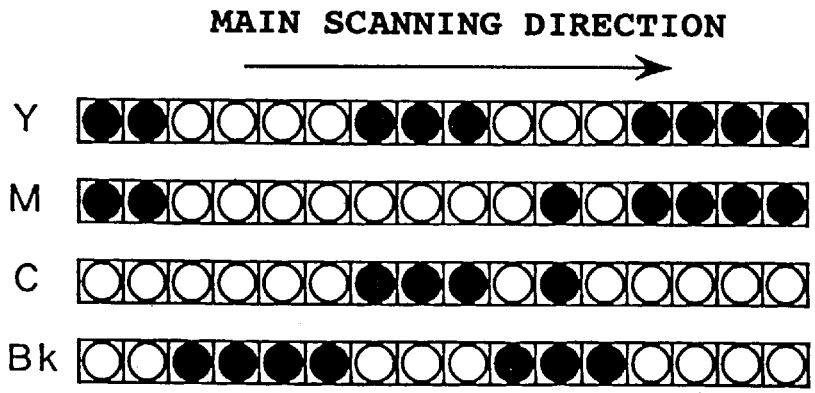
FIGS. 7A and 7B schematically indicate results of the process performed by the image processors of FIGS. 3 and 4.

FIG. 4 is the detailed hardware block diagram of the thinning circuit 201. In FIG. 4, CLK is a data transfer clock. Y, M, C, and BK are data of yellow, magenta, cyan, and black respectively. By using the basic data, e.g., Bk data, a boundary of an image is detected by an edge detecting circuit 206. A timing chart when data shown in FIG. 7A are inputted to the thinning circuits 201 is represented in FIG. 5. The edge detecting circuit 206 makes an ENB signal "1(high)" for one cycle of the data transfer clock (CLK) when the Bk data becomes "1" from "0," whereas it makes ENB signal "1" for two cycles of the CLK when the Bk data becomes "0(low)" from "1(high)." When the Bk data is changed from "1" to "0," the edge detecting circuit 206 makes EDGE_RESET signal active for ½ cycle of the CLK and when the ENB signal changes from "1" to "0" under a condition that the Bk is "0," the edge detecting circuit 206 makes an EDGE_RESET signal "1" for ½ cycle of the CLK. The EDGE_RESET signal resets the counter 204.

Latches 202 store the color data of Y, M, C respectively, which is constructed of a three-stage. Comparator 203 compares two sets of color data with each other, which are stored into the first and second stages of latches 202 and which are adjoining to each other along the main scanning direction, concerning all color data of Y, M, C. When the compared color data are identical, the comparator 203 outputs an UP signal for ½ cycle. Conversely, when the compared color data are not identical, the comparator 203 outputs a RESET signal for ½ cycle. Counter 204 counts the UP signal entered from the data comparator 203. The RESET signal resets the counter 204. Comparator 205 compares the data counted by the counter 204 with the reference data 208. In case that the count value A of the counter 204 is greater than the data B set as the reference data, and when the ENB signal is "1(active)," the comparator 205 sends a data clear signal (A>B signal) to the second-staged latch circuit 202. Data latches 207 synchronize the Bk data with the color data of Y, M, C.

Each of three A>B signals clears each color data and thins the dots of each color. The data comparator 205 makes the A>B signal active only when the ENB signal is active. In the first embodiment, since "0" is set as a reference data, the A>B signal becomes active in case that more than two pixels of the same color are continuously produced.

In the timing chart shown in FIG. 5, for example when the third CLK is produced, the A>B signal becomes active. This is because the color data of Y, M, and C are identical for two pixels and the ENB signal is active. At the eighth CLK, the A>B signal becomes active under the similar condition. At the 10th and the 11th CLK, the ENB signal becomes active whereas the A>B signal does not become active since the color data has not continued for two pixels.

Figure 6:
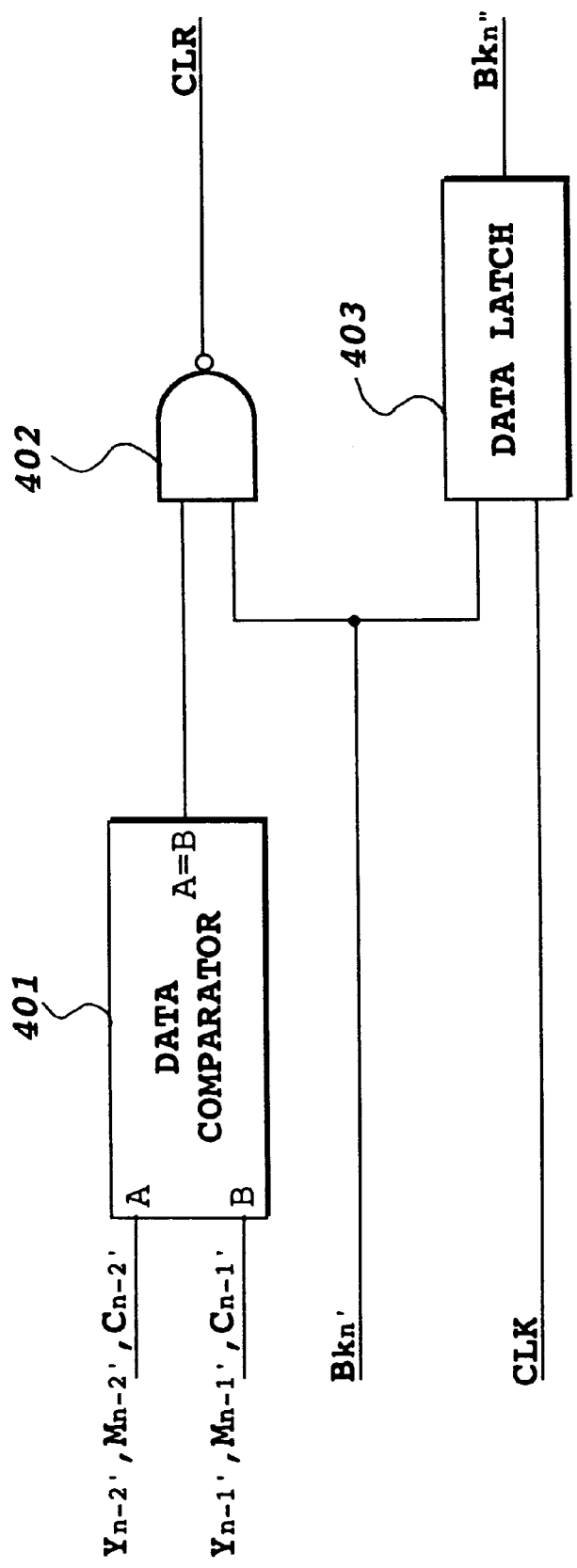
FIG. 6 is a timing chart for explaining process executed in the image processors of FIGS. 3 and 4.

FIG. 6 is a block diagram indicating an internal circuit of the above-described data processing unit 303. In FIG. 6, n–1 and n–2 are the data signal of the pixels which are adjacent to n-th pixel along the sub-scanning direction. When the signals of n–1 and n–2 are coincident at a comparator 401, and when the Bk signal is "1," the AND gate 402 makes a clear signal (CLR) "0(active)." The active CLR signal clears the color data stored in the data latch 302. Some of ink dots data are excluded along the sub-scanning direction.

Figure 7B:
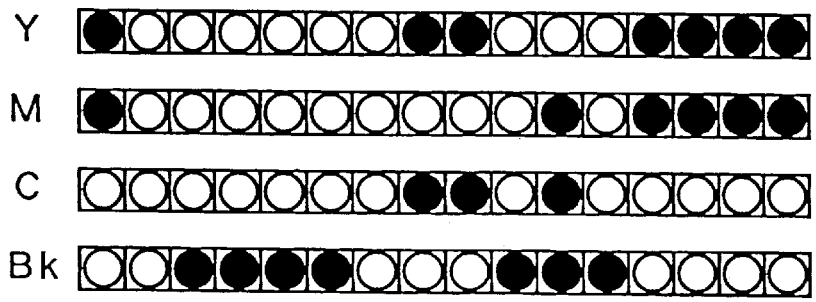

The results of thinning process performed by the above-described circuits are represented in FIG. 7B. As apparent from FIG. 7B, the second data of Y. M, and the seventh data of Y, C, which are the peripheral data of active Bk, have been converted to non printing data by the thinning process, as compared with the data before thinning process shown in FIG. 7A. Since the color data of the two adjoining pixels are not same, ninth and the eleventh pixel color data are not thinned. Unless more than 4 same pixel data continues from falling edge to rising edge, the color data are not thinned.

FIG. 8 schematically shows a relationship between the recording data processed by the above-described circuit, and the main scanning direction and the sub-scanning direction.

Figure 9A:
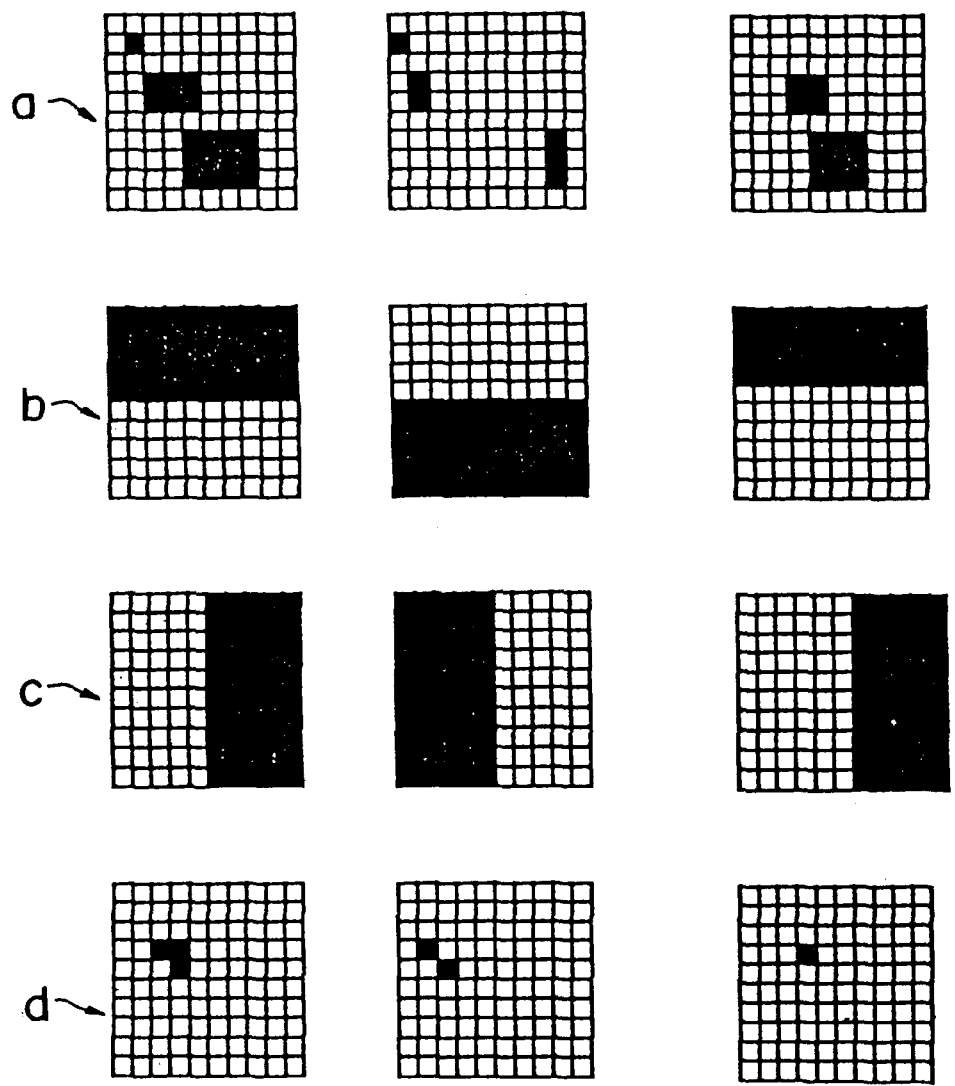
FIGS. 9A and 9B schematically show results of the process performed by the color ink jet printer according to the present invention.
Figure 9B:
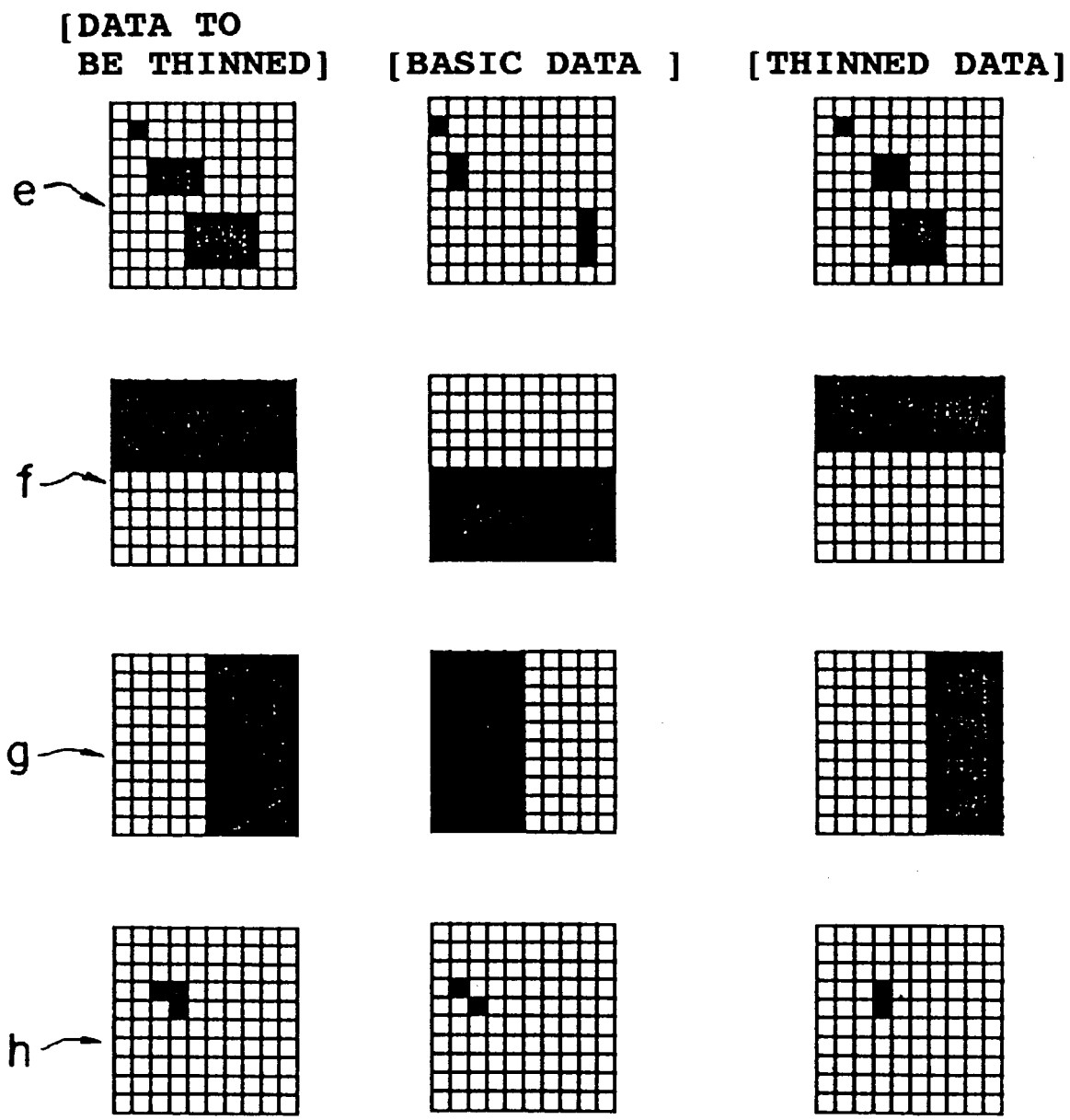

FIGS. 9A and 9B show processed results obtained by the circuits of the first embodiment. FIG. 9A represents a thinning process for forcibly thinning 1 dot (1 pixel) of color data along the main scanning and sub-scanning directions at the boundary of the basic data. FIG. 9A is a processed example obtained when –1 is set as the reference data 208. FIG. 9B indicates a thinning process for thinning data only when two dots are identical along the main scanning and sub-scanning directions at the boundary of the basic data.

These two processes are different in such a case that an image is constructed of a few dots such as "a" and "e," or "d" and "h." In the process of FIG. 9A, since all of adjoining dots of the basic data are thinned, one independent dot disappears. There is no upper left dot in the thinned data figure of "a" in FIG. 9A. To the contrary, according to the process operation of FIG. 9B, since the image is thinned only when the same data continues for more than two dots, no independent dot is dropped in the thinned data.

When the images of basic data and the data to be thinned are made of many dots as illustrated in "b" and "f" or "c" and "g", the same thinning results are obtained in the non-conditional thinning process of FIG. 9A, and in the thinning process of FIG. 9B. As a consequence, the color ink blurring can be effectively suppressed even in the thinning process of FIG. 9B.

SECOND EMBODIMENT

Figure 10:
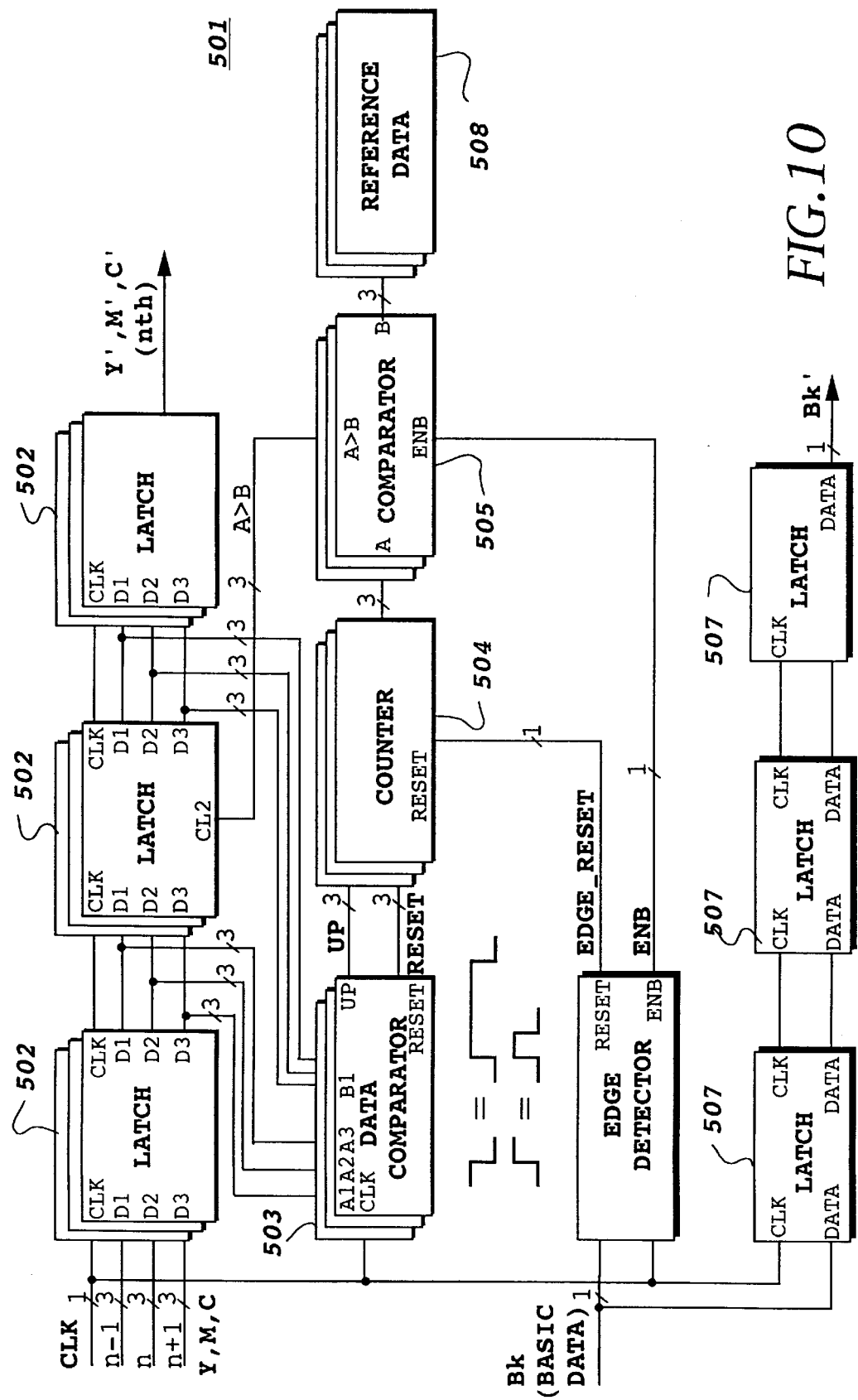
FIG. 10 is a schematic block diagram for representing a partial circuit arrangement of an image processor according to the present invention.

FIG. 10 is a schematic block diagram of an image processor 102 according to a second embodiment. FIG. 10 corresponds to FIG. 3 of the first embodiment.

In the first embodiment, more than two adjoining pixels are counted along the main scanning or sub-scanning direction to thin the image. In this second embodiment, each color pixel is counted not only along the main scanning and sub-scanning directions, but also along the inclined direction to thin the data.

In FIG. 10, latches 502 latch three pixels of each color data (Y, M, C) along the sub-scanning direction. Each of data comparator 503 provided for each color outputs an UP signal when the data of all pixels are coincident with each other. That is, whether two pixels of the color data are coincident or not is checked along the main scanning direction, the sub-scanning direction, and the inclined direction. When the color data are coincident with each other, each comparator 503 makes the UP signal "1." The comparator 503 also makes the RESET signal "1" when the data of corresponding color is changed. The counter 504 counts the UP signal derived from the data comparator 503. The edge detector 506 makes EDGE_RESET signal and ENB signal active when Bk data (basic data) is changed from "0" to "1," or from "1" to "0" similarly to the first embodiment. The comparator 505 compares the count value A of the counter 504 with a content B of reference data 508, and outputs A>B signal when A>B and the ENB signal is active.

FIG. 11A shows an original data before the thinning process and FIG. 11B schematically indicates the thinning process results obtained by the image processor.

Color data of pixel "n" of each color (Y, M, C) are compared with the data of adjoining pixels "n−1" and "n+1" along the sub-scanning direction. In Fig. 11B, the second pixel of Y, M located adjacent to the boundary of the basic data along the main scanning direction is thinned. However, the seventh pixels of Y and C are not thinned because there are "0" in their adjoining pixels along the sub-scanning direction, which is different from the seventh pixel of data "1" for the pixel "n" to be thinned.

Figure 12:
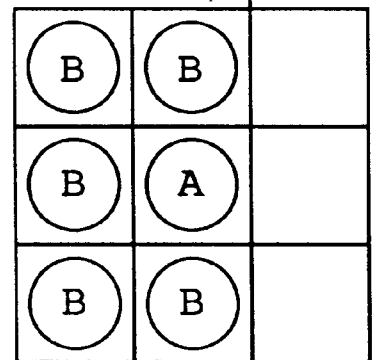
FIG. 12 schematically explains the processing method according to the present invention.

FIG. 12 is a schematic diagram for simply explaining the above-described process.

Symbol A of FIG. 12 indicates a pixel to be processed. Only when all of B are identical to A, A is thinned. Otherwise A is not thinned. The pixel drops which have been explained in the first embodiment, can be prevented by this process.

THIRD EMBODIMENT

Figure 13:
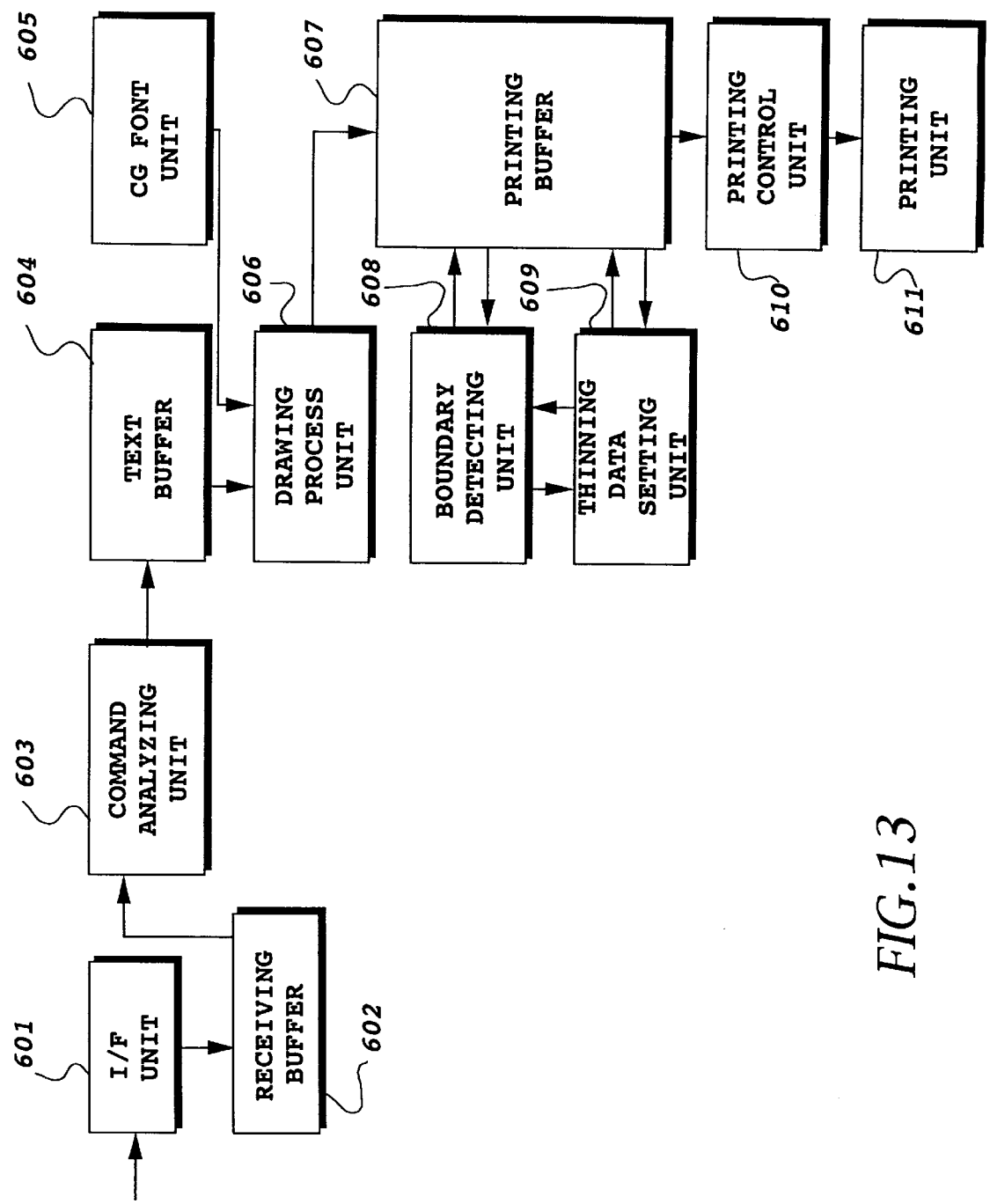
FIG. 13 is a schematic block diagram for showing a hardware arrangement of a color thinning circuit.

In this embodiment, structure of image processor differs from one of the first and the second embodiments. FIG. 13 is a functional block diagram of an image processor 103 according to the third embodiment. In FIG. 13, I/F unit 601 receives transmission data from a host unit, and the receiving buffer 602 temporarily stores the transmission data received by the I/F unit 601. The command analyzing unit 603 analyzes a control code, a character code, an image code and the like, which are transmitted from the host unit, and then causes the analyzed codes to be stored into a text buffer 604 in the form of text information. The CG font unit 605 stores a character font used to expand the character code into a image data. The drawing process unit 606 refers the text information stored in the text buffer 604 and expands the CG font 605 into image data to be printed out. The resultant image data is stored into a printing buffer 607. The boundary detecting unit 608 detects boundaries among the respective color data Y, M, C, and Bk which have been stored into the printing buffer 607. The thinning data setting unit 609 alternately thins specific color data and other color data which are positioned adjoining the specific color data at the boundary based upon the coordinate value of the boundary detected by the boundary detecting unit 608. The printing control unit 601 controls the printing operation of a printing unit 611. The printing unit 611 prints out various images on a recording medium such as paper.

Figures 14A, 14B:
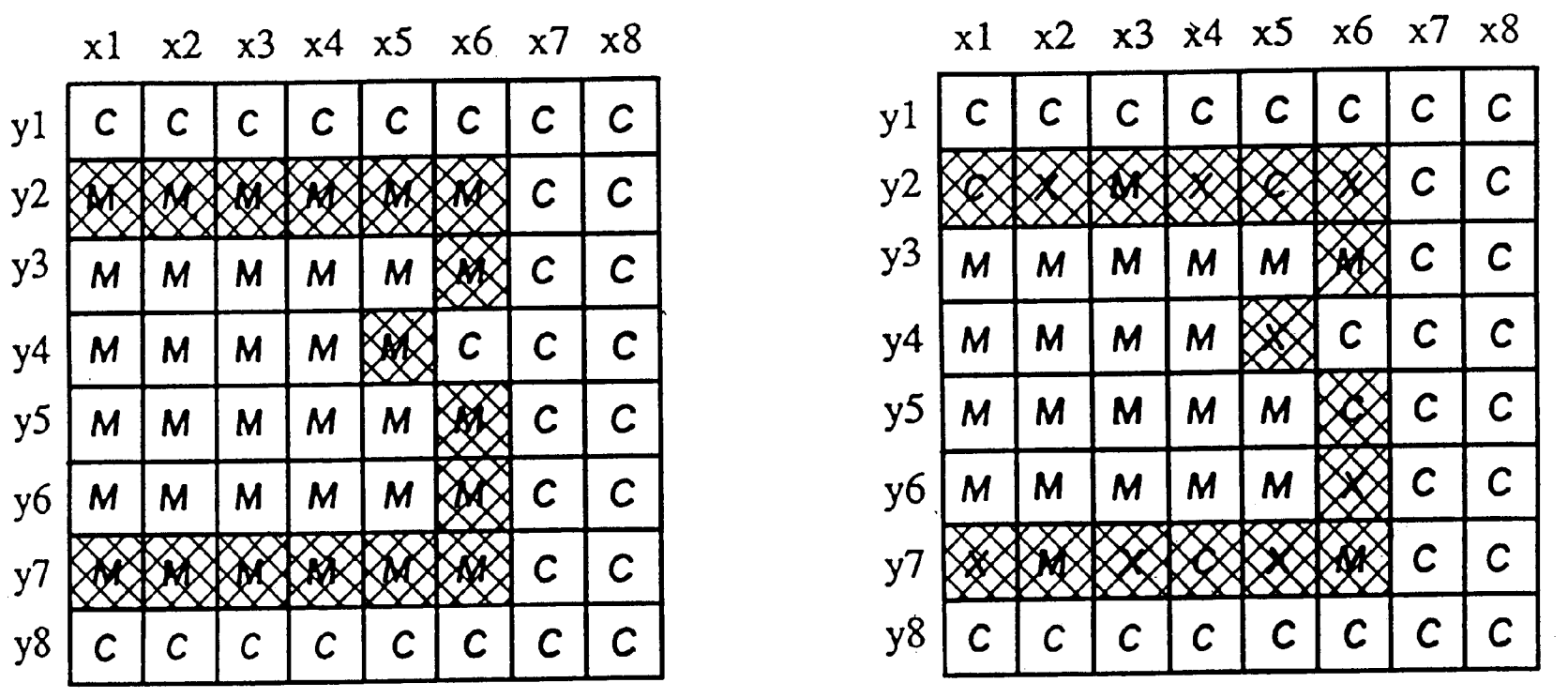

FIGS. 14A and 14B show an example of printing results. FIG. 14A indicates pixel data that is transmitted by the host unit, expanded to an image by the drawing process unit 606, and stored in the printing buffer 607. FIG. 14B represents an example of data obtained by thinning the dots data located at the boundary detected by the boundary detecting unit 608. The boundary detecting unit 608 detects such meshed boundary portions as shown in FIG. 14A in unit of 1 line, or plural lines from the pixel data expanded into the printing buffer 607.

Figure 15:
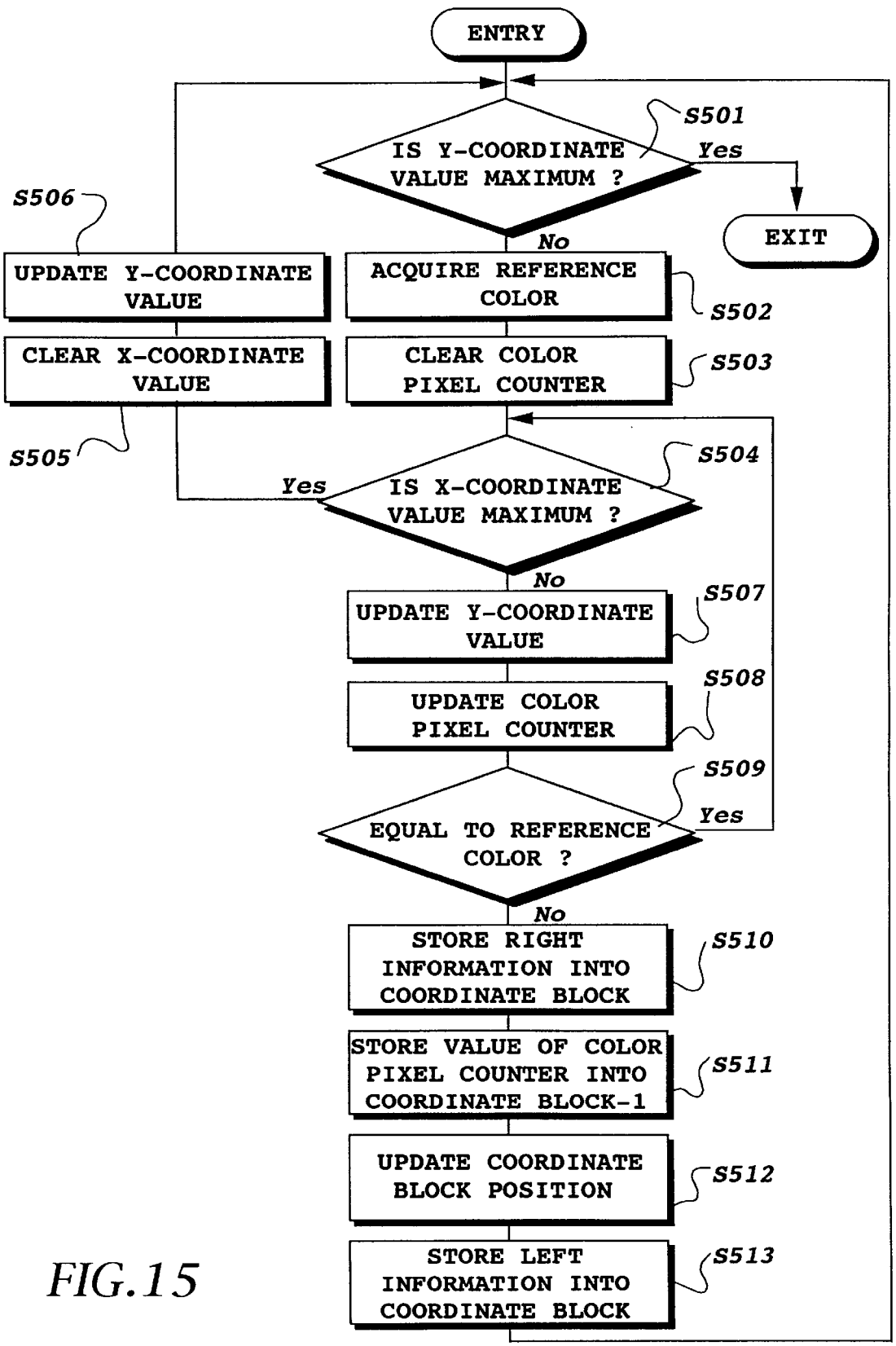
FIG. 15 is a flow chart for explaining the detection of boundaries along the main scanning direction, performed by the printer.

FIG. 15 is a flow chart for representing the boundary detecting operation by the boundary detecting unit 608 along the main scanning direction. At a step 501 of this flow chart, a judgment is made whether the process is accomplished by comparing the process line number along the sub-scanning scanning direction with the maximum process line number. At a step 502, pixel data of the present coordinate value is stored to determine a reference color which is used to judge a color changing pixel. At a step 503, the count values of the counters for counting the number of continuous colors are cleared. At a further step 504, the x coordinate value under process is compared with the maximum dot number of 1 line, and the process is repeated within 1 line. At the next step 505, after the process of 1 line has been completed, the x coordinate value is returned to the printing buffer to process the subsequent line. At a step 506, the y coordinate value is updated by 1 dot to the pixel value of the adjoining pixel data. At a step 508, the color pixel counter is incremented to count the pixel number of the same color. At a step 509, the pixel data used as the reference data is compared with the pixel data of the updated coordinate value to check whether a different color appears. In case of the same pixel data, the process is returned to a step 507 at which the pixel data of the adjoining coordinate is checked. At a step 510, as a comparison result at the step 509, the reference color pixel data is used as the changing pixel, and the coordinate value of "(x coordinate value)−1" is employed as the boundary coordinate of the color located at the right side of the color which has been already checked.

The coordinate value, the counting number indication, and the positional information indicative of the right-sided boundary are stored into the present coordinate block position of the place where the compared colors are combined in the boundary coordinate table shown in FIG. 19.

At a step 511, the color pixel count is stored in the coordinate block preceding one block to the present block which represents the left-sided boundary. In case of the block 1, namely the first block, the step 511 is not executed. At a step 512, the coordinate block is updated. At a step 513, the pixel data of the different color compared at the previous step 509 is set as a reference color. Also, the x coordinate value is set as a new color coordinate value at the left-sided boundary. Both of this coordinate value and the positional information indicative of the left-sided boundary are stored into the present coordinate block position about the place where the compared colors are combined in the boundary coordinate table shown in FIG. 19. After the process defined at the step 513 has been accomplished, the process is returned to the step 501 and the changing pixel is set as the reference pixel.

FIG. 17 represents a boundary coordinate table along the main scanning direction. The coordinate value of the boundary portion detected by the boundary detecting process is stored into the area of the same pixel data of the place where the comparing color A is coincident with the comparing color B together with the reference color and the changing color. For instance, as illustrated in FIGS. 23A and 23B, when the pixel data of magenta M is used as the reference color, and the changing pixel of cyan C is detected, the coordinate values of the changing pixel for "(x-coordinate value)−1" are entered into the area MH of the comparing color A, the area GH of the comparing color B, and the area M of the pixel data, whereas the coordinate value of the changing pixel is stored into the area of the pixel data C. An example of the data which have been stored in accordance with this manner is represented in FIG. 23B.

FIG. 20 schematically indicates a structure of data for storing the boundary coordinates of the boundary table. Single boundary data is constructed of three pieces of information, i.e., a coordinate value, positional information, and a pixel number. The coordinate value corresponds to a coordinate value of a detected boundary. The positional information is constituted by 4 bits. This positional information indicates which side of color block the boundary is. When the bit 1 is ON, the positional information indicates the left side. When the bit 2 is ON, the positional information indicates the right side. When the bit 3 is ON, the positional information denotes the upper side. When the bit 4 is ON, the positional information represents the lower side. For example, all 4 bits of the positional information of 1 pixel surrounded by different color blocks are ON.

Figure 16:
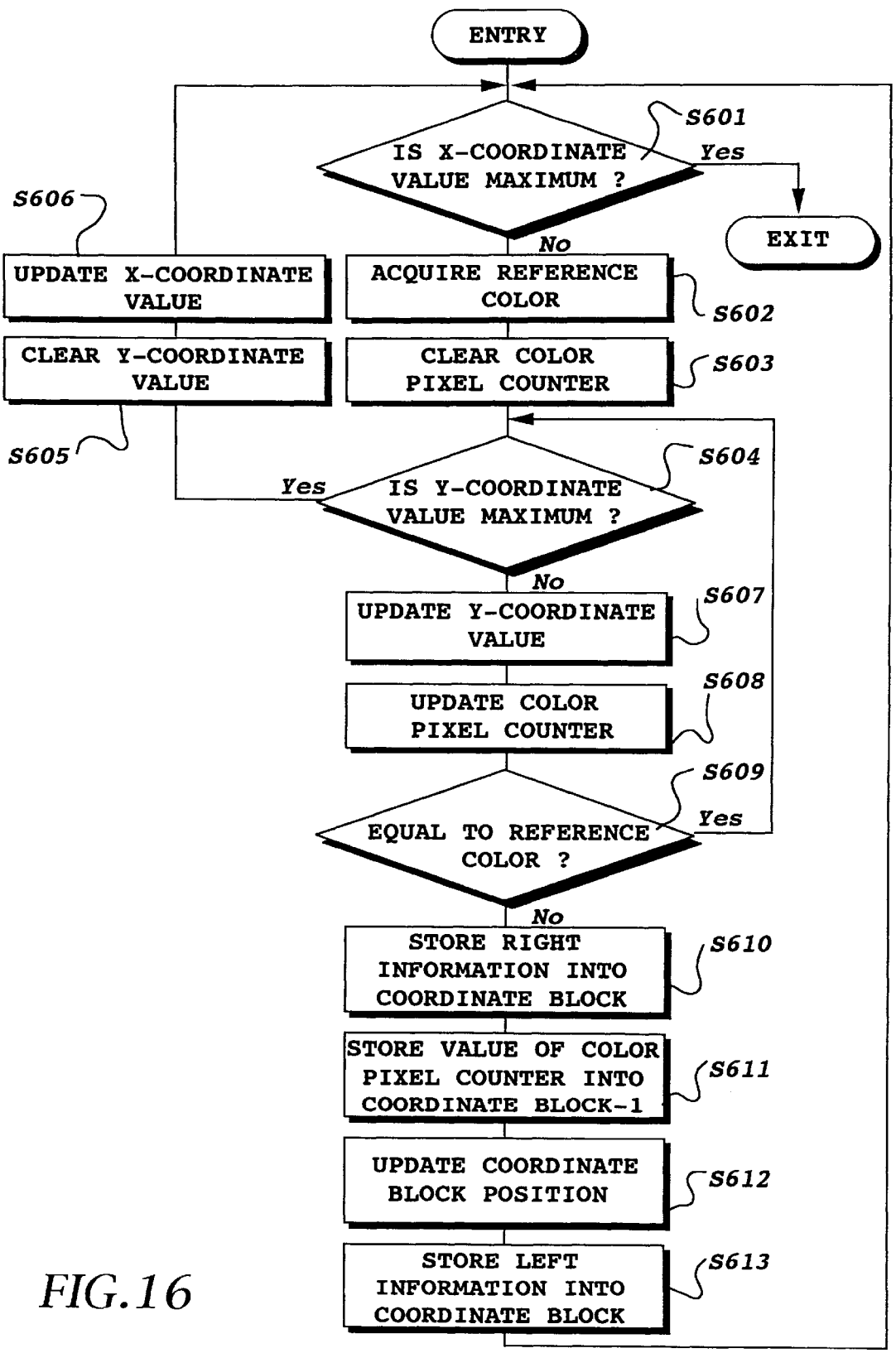
FIG. 16 is a flow chart for explaining the detecting operation of boundaries along the sub-scanning direction, performed by the printer.

FIG. 16 is a flow chart explaining the boundary detecting operation by the boundary detecting unit 308 along the sub-scanning direction. The major function of this boundary detection along the sub-scanning direction is similar to that performed along the main scanning direction, is carried out in such a manner that a certain number of boundary coordinate values along the sub-scanning direction, which is equal to several dot numbers of the printing buffer along the main scanning direction, is processed in unit of 1 line, or plural lines, whereby the boundary coordinate values along the sub-scanning direction are detected. In the flow chart of FIG. 16, the processing number along the main scanning direction is compared with the maximum dot number within the printing buffer along the main scanning direction to judge whether the process is complete at a step 601. At a step 602, the recent coordinate pixel data is stored to determine a basic color by which a color changing pixel is judged. At a step 603, the content of the color pixel counter for counting the quantity of same continued colors is cleared. At the next step 604, the y-coordinate value under process is compared with the maximum processing line number, and the process is repeated within 1 column. At a step 605, after the process for 1 column has been accomplished, the y-coordinate value is returned to the head to perform the process for the next column. At a step 606, x-coordinate value is updated for the subsequent column. At a step 607, the y-coordinate value is updated by 1 dot to become the coordinate value of the adjoining pixel data. At a step 608, the content of the color pixel counter is updated to calculate the pixel quantity of same colors. At a further step 609, the pixel data of the updated coordinate value is compared with the reference pixel data to check whether a different color appears. In case of the same pixel data, the process is returned to a step 607 at which another check is done about the pixel data of the adjoining coordinate. At a step 610, as a result of comparison effected at the step 609, while the pixel data of the reference color is used as the changing pixel, a coordinate value of "(y-coordinate value)–1" is employed as the lower boundary coordinate value of the color which has been so far investigated. This coordinate value, the color pixel counting number, and the positional information indicative of the lower boundary are stored into the present coordinate block position of the place where the compared colors are combined with each other, in the boundary coordinate table shown in FIG. 19.

At a step 611, the color pixel count is stored into the coordinate block preceding the present coordinate block by 1 block to store it into the data block representative of the upper boundary. It should be noted that this process defined at the step 611 is not executed when the first block is the block 1. At a step 612, the coordinate block is updated. At the subsequent step 613, the pixel data about the different color which has been compared at the step 609 is employed as the reference color. The y-coordinate value is used as the coordinate value of the upper boundary for the new color. Both of this coordinate value and the positional information indicative of the upper boundary are stored into the present coordinate block position of the place where the colors compared in the boundary coordinate table indicated in FIG. 19 are combined with each other. At the step 613, the process is returned to the previous step 601 while the changing pixel is recognized as the reference color.

On the other hand, a boundary coordinate table along the sub-scanning direction is represented in FIG. 18. The coordinate value at the boundary which has been detected during the boundary detecting process along the sub-scanning direction, is stored based upon the reference color and the changing color into the area of the same pixel data at the place where the comparison color A of the boundary coordinate table is coincident with the comparison color B. For instance, as indicated in FIG. 24A and FIG. 24B, when magenta M is employed as the reference color and the changing pixel of cyan C is detected, the comparison color A corresponds to MV, the comparison color B corresponds to CV, the coordinate value of "(y coordinate value)–1" is entered into the area of the pixel data M, and the coordinate value of the changing pixel is stored into the area of the pixel data C. An example of the color data which have been processed and stored according to the above described manner is represented in FIG. 24B.

Subsequently, based upon the boundary coordinate table along the main scanning direction shown in FIG. 17 and the boundary coordinate table along the sub-scanning direction indicated in FIG. 18, the main scanning and sub-scanning coordinate values are rearranged in unit of reference colors and changing colors and stored into another boundary coordinate table indicated in FIG. 19. For instance, as shown in FIG. 25A and FIG. 25B, the coordinates are arranged based upon the data shown in FIG. 23B and FIG. 24B. In case that the same coordinate values are stored in the boundary coordinate table along the main scanning direction and the boundary coordinate table along the sub-scanning direction, since the positional information within the block represents both of the coordinate values, only one coordinate value which has smaller pixel number is stored.

The thinning data setting unit 309 thins or pulls down the pixel data of the boundary coordinate values which are detected by the boundary detecting unit 608. Based on the coordinate values stored in the boundary coordinate table shown in FIG. 19, the pixel data of the continuous coordinate values stored in the printing buffer are rearranged for each of the combinations between the reference colors and the changing colors in the order of the reference color data, non printing data, changing color data, and non printing data. For example, to produce such data as shown in FIG. 14B by thinning the data of FIG. 21B, the pixel data are set in such a way that the pixel data (x1, y2) of the block 1 is cyan C', the pixel data (x2, y2) of the block 2 corresponds to the non printing data, the pixel data (x3, y2) of the block 3 is magenta M, and the pixel data (x4, y2) of the block 4 is the non printing data.

As apparent from FIG. 14B, it is possible to mitigate the ink blurring at the boundary by setting the pixel data in the order of the reference color C, the non printing data X, the changing color M, and the non printing data X under such a condition that the magenta color dot M is not localed adjacent to the reference color dot C at the meshed portion of the boundary between the magenta and the reference color.

FOURTH EMBODIMENT

A fourth embodiment of the present invention is featured such that two color pixel data are thinned which are in contact with the boundary detected by the boundary detecting unit 608.

Figures 22A, 22B:
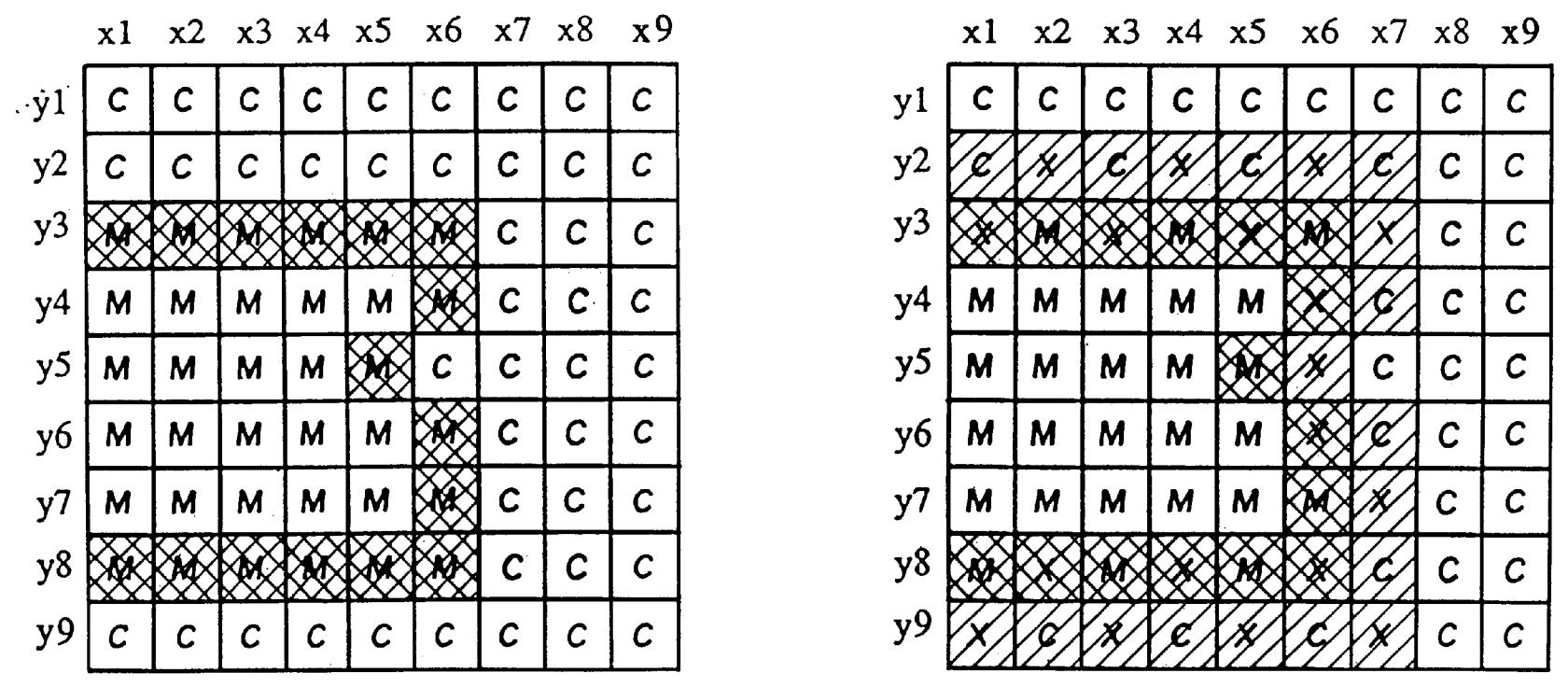

FIG. 22A illustrates a plurality of pixel data stored in the printing buffer under control of the drawing process unit 306. FIG. 22B represents such data produced by thinning the pixel data at the boundary before the data stored in the print buffer is outputted by the print controlling unit 310.

For instance, two color data located in such meshed boundaries as shown in FIG. 23A and FIG. 24A are stored in the storage region where the comparison color A is M and the comparison color B is C as the boundary coordinate data as represented in the boundary coordinate table of FIG. 23A and 24B. Based on these data the pixel data is stored in the storage region where the comparison color A is M and the comparison color B is C as the boundary coordinate data as shown in the coordinate table of FIG. 25B to form the two-color boundary of FIG. 25A.

Next, the thinning data, setting unit 609 thins, or pulls out the pixel data of the boundary coordinate detected by the boundary detecting unit 608. In other words, based upon the coordinate values stored in the boundary coordinate tables indicated in FIG. 23B, FIG. 24B and FIG. 25B, the coordinate data about the boundary coordinate stored in the print buffer are rearranged in unit of single pixel in the order of the printing data and the non printing data. For instance, based on the data indicated in FIG. 25B, the pixel data M are rearranged to obtain the data shown in FIG. 22B in such a manner that the pixel data (x1, y2) of the boundary coordinate block 1 about the pixel data M is the non printing data, the pixel data (x2, y2) of the block 2 is the ink-ejecting data, the pixel data (x3, y2) of the block 3 is the non printing data, and the pixel data (x4, y2) of the block 4 is the ink-ejecting data. Also, the pixel data C are rearranged in such a way that the pixel data (x1, y1) of the boundary coordinate block 1 is the ink-ejecting data, the pixel data (x2, y1) of the block 2 is the non printing data, the pixel data (x3, y1) of the block 3 is the ink-ejecting data, and the pixel data (x4, y1) of the block 4 is the non printing data.

As obvious from FIG. 22B, the meshed boundary portions of the pixel data M and C are not located adjacent to each other at the pixel data M and C, but the pixel data are set in such a manner that the boundary portion of the pixel data C is ordered by the ink-ejecting data C and the non printing data X, and the boundary portion of the pixel data M is ordered by the non printing data X and the ink-ejecting data M. Accordingly, the ink blurring at the boundary can be reduced.

FIFTH EMBODIMENT

Figures 26A, 26B:
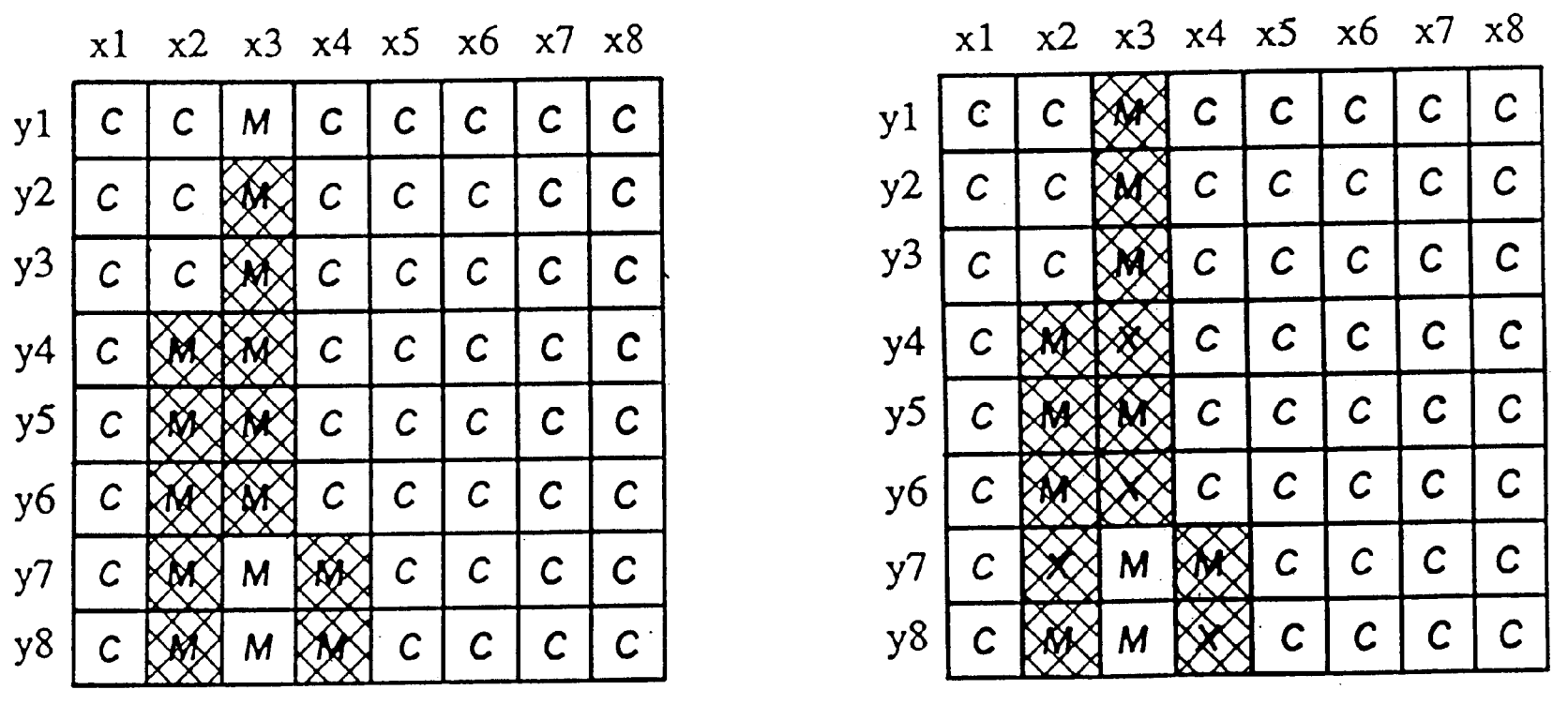

In a fifth embodiment, pixel data is thinned, or pulled out when a width of a boundary portion is smaller than, or equal to 3 dots. FIG. 26A shows a plurality of pixel data which are image-expanded and stored in the printing buffer 607. Before the print control unit 610 outputs the expanded image of the printing buffer, some of the pixel data at the boundary is excluded. The thinning results are shown in FIG. 26B. In accordance with the pixel data thinning process of the fifth embodiment, the pixel data are thinned according to the method based on the pixel number within the respective blocks of the boundary coordinate table after the boundary coordinate has been stored in the boundary coordinate table of FIG. 19. The pixel number indicated in the respective blocks of the boundary coordinate tables represents the width between the boundary coordinates of the same column or row in the same color. No thinning process of the pixel data is performed when either the coordinate width of the same column in the boundary portion, or the width between the coordinates at the same row is equal to 1 dot. In case that the same column of the boundary portion has 2 dots, the pixel data about any one of the upper-sided boundary coordinate and the lower-sided boundary coordinate are thinned in accordance with the thinning method as previously explained in the first and the second embodiments. In case that the same row of the boundary portion has 2 dots, the pixel data of any one of the left-sided boundary coordinate and the right-sided boundary coordinate are thinned in accordance with the thinning method as previously explained in the first and the second embodiments. When the width between the coordinates of the same column, or the same row of the coordinate line is greater than, or equal to 3 dots, the image is thinned in accordance with the first embodiment or the second embodiment.

As apparent from FIG. 26B, at the meshed portions of the boundary, the pixel data M and C are not adjacent. When the data of the boundary portion at the pixel data M are set in the order of the non printing data X and the ink-ejecting data M, the width of the pixel data M is calculated to control the thinning process, so that the dots can be thinned without dropping any character pattern or a figure pattern which is constructed by the small number of dot. Then, the drawback of the ink blurring at the boundary can be mitigated.

As previously described, according to the fifth embodiment, all the pixel data at the boundary are not thinned. Instead, the pixel data are rearranged in the order of the reference color data, the non printing data, the changing color data, and the non printing data. Otherwise, the two-color pixel data about the two-color coordinate data located adjacent to the boundary are rearranged in the order of the ink-ejecting data and the non printing data. As a consequence, since the color ink of the image at the boundary portion is not blurred, such various problems that sharpness of the image is lowered and scratches are caused by color fluctuation and the thinning process, can be solved.

While the present invention has been described in detail, an ink blurring problem occurred at the two-color boundary such as the edge of the color image can be mitigated, so that sharpness of the printed color image can be improved and no fluctuation is made in ink concentration. Other conventional problems such that ink is attached to the ink ejecting plane of the recording head, whereby no ink is ejected, and the water repellent effect of the ink ejecting plane is weaken by sliding the paper on this ink ejecting plane, whereby the ink is easily attached thereon, could be solved.

Furthermore, according to another advantage of the present invention, when same ink dots are continuously adjoining to another ink for more than a predetermined number of the ink dots, the dots of either ink are thinned. As a result, the ink blurring can be mitigated, and thus deterioration in the recording qualities caused by such an ink blurring can be prevented even when a recording medium with a poor ink absorption capability is employed.

OTHERS

In the first embodiment, whether color data is excluded or not is determined by the pixels on the lines (rows) above the processed pixel (lines of n−1 and n−2), however in the first embodiment it may be determined by the pixels on the lines (rows) above and under the processed pixel (lines of n−1 and n+1) as mentioned in the second embodiment. It may be determined by the pixels on more than three lines.

In the first and second embodiments, whether color data is excluded is determined by the pixels on the same and left columns of the processed pixel. However it may be determined by only the pixels on the left columns, by the pixels on the same and right columns, or only by the pixels on the right columns. Furthermore, at the beginning boundary of the basic color, whether color data is excluded or not may be determined by the pixels on the same and left columns of the processed pixel, while at the ending boundary of the basic color, it may be determined by the pixels on the same and right columns. At the beginning boundary of the basic color, whether color data is excluded or not may be determined by the pixels on the left columns, while at the ending boundary of the basic color, it may be determined by the pixels on the right columns.

Figure 27:
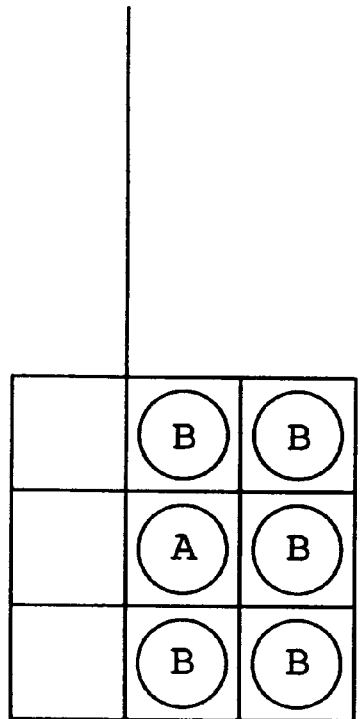
FIG. 27 schematically represents requirements for thinning dots.

In case whether color data is excluded or not is determined based on the pixels on the same and right columns of the processed pixel, as shown in FIG. 27, pixel A may be excluded when the data of the pixel A is identical to all data of pixels indicated by B.

The present invention achieves distinct effects when applied to a recording head or a recording apparatus which has means for generating thermal energy such as electro thermal transducers or laser light, and which causes changes in ink by the thermal energy so as to eject ink. This is because such a system can achieve a high density and high resolution recording.

A typical structure and operational principle thereof are disclosed in U.S. Pat. Nos. 4,723,129 and 4,740,796, and it is preferable to use this basic principle to implement such a system. Although this system can be applied either to on-demand type or continuous type ink jet recording systems, it is particularly suitable for the on-demand type apparatus. This is because the on-demand type apparatus has electro thermal transducers, each disposed on a sheet or liquid passage that retains liquid (ink), and operates as follows: first, one or more drive signals are applied to the electro thermal transducers to cause thermal energy corresponding to recording information; second, the thermal energy induces sudden temperature rise that exceeds the nucleate boiling so as to cause the film boiling on heating portions of the recording head; and third, bubbles are grown in the liquid (ink) corresponding to the drive signals. By using the growth and collapse of the bubbles, the ink is expelled from at least one of the ink ejection orifices of the head to form one or more ink drops. The drive signal in the form of a pulse is preferable because the growth and collapse of the bubbles can be achieved instantaneously and suitably by this form of drive signal. As a drive signal in the form of a pulse, those described in U.S. Pat. Nos. 4,463,359 and 4,345,262 are preferable. In addition, it is preferable that the rate of temperature rise of the heating portions described in U.S. Pat. No. 4,313,124 be adopted to achieve better recording.

U.S. Pat. Nos. 4,558,333 and 4,459,600 disclose the following structure of a recording head, which is incorporated to the present invention: this structure includes heating portions disposed on bent portions in addition to a combination of the ejection orifices, liquid passages and the electro thermal transducers disclosed in the above patents. Moreover, the present invention can be applied to structures disclosed in Japanese Patent Application Laying-open Nos. 123670/1984 and 138461/1984 in order to achieve similar effects. The former discloses a structure in which a slit common to all the electro thermal transducers is used as ejection orifices of the electro thermal transducers, and the latter discloses a structure in which openings for absorbing pressure waves caused by thermal energy are formed corresponding to the ejection orifices. Thus, irrespective of the type of the recording head, the present invention can achieve recording positively and effectively.

The present invention can be also applied to a so-called full-line type recording head whose length equals the maximum length across a recording medium. Such a recording head may consist of a plurality of recording heads combined together, or one integrally arranged recording head.

In addition, the present invention can be applied to various serial type recording heads: a recording head fixed to the main assembly of a recording apparatus; a conveniently replaceable chip type recording head which, when loaded on the main assembly of a recording apparatus, is electrically connected to the main assembly, and is supplied with ink therefrom; and a cartridge type recording head integrally including an ink reservoir.

It is further preferable to add a recovery system, or a preliminary auxiliary system for a recording head as a constituent of the recording apparatus because they serve to make the effect of the present invention more reliable. Examples of the recovery system are a capping means and a cleaning means for the recording head, and a pressure or suction means for the recording head. Examples of the preliminary auxiliary system are a preliminary heating means utilizing electro thermal transducers or a combination of other heater elements and the electro thermal transducers, and a means for carrying out preliminary ejection of ink independently of the ejection for recording. These systems are effective for reliable recording.

The number and type of recording heads to be mounted on a recording apparatus can be also changed. For example, only one recording head corresponding to a single color ink, or a plurality of recording heads corresponding to a plurality of inks different in color or concentration can be used. In other words, the present invention can be effectively applied to an apparatus having at least one of the monochromatic, multi-color and full-color modes. Here, the monochromatic mode performs recording by using only one major color such as black. The multi-color mode carries out recording by using different color inks, and the full-color mode performs recording by color mixing.

Furthermore, although the above-described embodiments use liquid ink, inks that are liquid when the recording signal is applied can be used: for example, inks can be employed that solidify at a temperature lower than the room temperature and are softened or liquefied in the room temperature. This is because in the ink jet system, the ink is generally temperature adjusted in a range of 30° C.–70° C. so that the viscosity of the ink is maintained at such a value that the ink can be ejected reliably.

In addition, the present invention can be applied to such apparatus where the ink is liquefied just before the ejection by the thermal energy as follows so that the ink is expelled from the orifices in the liquid state, and then begins to solidify on hitting the recording medium, thereby preventing the ink evaporation: the ink is transformed from solid to liquid state by positively utilizing the thermal energy which would otherwise cause the temperature rise; or the ink, which is dry when left in air, is liquefied in response to the thermal energy of the recording signal. In such cases, the ink may be retained in recesses or through holes formed in a porous sheet as liquid or solid substances so that the ink faces the electro thermal transducers as described in Japanese Patent Application Laying-open Nos. 56847/1979 or 71260/1085. The present invention is most effective when it uses the film boiling phenomenon to expel the ink.

Furthermore, the ink jet recording apparatus of the present invention can be employed not only as an image output terminal of an information processing device such as a computer, but also as an output device of a copying machine including a reader, and as an output device of a facsimile apparatus having a transmission and receiving function.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

While the present invention has been described above with respect to five preferred embodiments thereof, it should of course be understood that the present invention should not be limited only to these embodiments but various changes or modifications may be made without departure from the scope of the present invention as defined by the appended claims.

What is claimed is:

1. An ink jet recording apparatus for ejecting ink in a form of droplets onto a recording medium to record an image, said apparatus comprising:

a plurality of recording heads, each recording head ejecting an ink different in color from colors of inks ejected from other recording heads;

data storage means for storing printing data and non-printing data for each of said recording heads;

boundary detecting means for detecting a boundary between the printing data and the non-printing data of a predetermined recording head of said plurality of recording heads in accordance with the printing data stored in said storage means;

judging means for judging whether printing data of at least one of remaining recording heads other than said predetermined recording head represents a predetermined number of consecutive dots or more at the boundary detected by said boundary detecting means; and thinning means for converting some of said printing data of said remaining recording heads into non-printing data when said judging means judges that the printing data of said at least one of said remaining recording heads represents the predetermined number of consecutive dots or more.

2. An ink jet recording apparatus as claimed in claim 1, further comprising:

head moving means for moving said recording heads along a main scanning direction; and recording medium shifting means for shifting said recording medium along a sub-scanning direction;

wherein said thinning means converts some of said printing data to said non-printing data when the printing data of said at least one of said remaining recording heads continues for more than two dots along said main scanning direction.

3. An ink jet recording apparatus as claimed in claim 1, further comprising:

head moving means for moving said recording heads along a main scanning direction; and recording medium shifting means for shifting said recording medium along a sub-scanning direction;

wherein said thinning means converts some of said printing data to said non-printing data when the printing data of said at least one of said remaining recording heads continues for more than two dots along said sub-scanning direction.

4. An ink jet recording apparatus as claimed in claim 1, further comprising:

head moving means for moving said recording heads along a main scanning direction; and recording medium shifting means for shifting said recording medium along a sub-scanning direction;

wherein said thinning means converts some of said printing data to non-printing data when the printing data of said at least one of said remaining recording heads continues for more than two dots along said main scanning direction and along said sub-scanning direction.

5. An ink jet recording apparatus as claimed in claim 1, wherein each of said recording heads generates bubbles in the ink by thermal energy to eject the ink in accordance with generation of said bubbles.

6. An ink jet recording apparatus for ejecting ink droplets into a recording medium to record an image, said apparatus comprising:

a plurality of recording heads, each recording head ejecting an ink different in color from colors of inks ejected from other recording heads;

data storage means for storing printing data and non-printing data of each of said different color inks;

boundary detecting means for detecting a boundary between one ink of said different color inks and remaining inks other than the one ink in accordance with the printing data stored in said storage means; and thinning means for converting some of said printing data of said one ink of said different color inks and said remaining inks at said boundary between said one of said different color inks and said remaining inks to non-printing data.

7. An ink jet recording apparatus as claimed in claim 6, wherein said thinning means converts some of said printing data of said one ink of said different color inks and said remaining inks to non-printing data so that said one ink of said different color inks does not border on said remaining inks.

8. An ink jet recording apparatus as claimed in claim 7, wherein said thinning means converts said printing data of said one ink of said different color inks and said remaining inks at said boundary between said one ink of said different color inks and said remaining inks to non-printing data alternately.

9. An ink jet recording apparatus as claimed in claim 6, wherein each of said recording heads generates bubbles in the ink by thermal energy to eject the ink in accordance with generation of the bubbles.

10. An ink jet recording method for an ink jet recording apparatus including a plurality of recording heads, each recording head ejecting an ink different in color from colors of inks elected from other recording heads, the recording heads ejecting the inks onto a recording medium to record an image, said method comprising the steps of:

storing printing data and non-printing data for each of said recording heads in a data storage means;

detecting a boundary between the printing data and the non-printing data of a predetermined recording head of said plurality of recording heads in accordance with the printing data stored in said storage means;

judging whether printing data of at least one of remaining recording heads other than said predetermined recording head represents a predetermined number of consecutive dots or more at said boundary detected in said detecting step; and thinning the image by converting some of said printing data of said at least one of said remaining recording heads into non-printing data when the printing data of said at least one of said remaining recording heads represents the predetermined number of consecutive dots or more.

11. An ink jet recording method as claimed in claim 10, further comprising the steps of:

moving said recording heads along a main scanning direction; and shifting said recording medium along a sub-scanning direction;

wherein said thinning step converts some of said printing data to said non-printing data when the printing data of said at least one of said remaining recording heads continues for more than two dots along said main scanning direction.

12. An ink jet recording method as claimed in claim 10, further comprising the steps of:

moving said recording heads along a main scanning direction; and shifting said recording medium along a sub-scanning direction;

wherein said thinning step converts some of said printing data to said non-printing data when the printing data of said at least one of said remaining recording heads continues for more than two dots along said sub-scanning direction.

13. An ink jet recording method as claimed in claim 10, further comprising the steps of:

moving said recording heads along a main scanning direction; and shifting said recording medium along a sub-scanning direction;

wherein said thinning step converts some of said printing data to non-printing data when the printing data of said at least one of said remaining recording heads continues for more than two dots along said main scanning direction and along said sub-scanning direction.

14. An ink jet recording method as claimed in claim 10, further comprising the step of effecting recording by ejecting the ink from each of the plurality of recording heads in accordance with the printing data.

15. An ink jet recording method as claimed in claim 14, wherein each of the recording heads comprises an electrothermal transducer for supplying thermal energy to the ink, and said recording step includes the step of driving the electrothermal transducer in accordance with the printing data to supply thermal energy to the ink so that bubbles are generated in the ink by the thermal energy so as to eject the ink from the recording head.

16. An ink jet recording method for an ink jet recording apparatus including a plurality of recording heads, each recording head ejecting an ink different in color from colors of inks ejected from other recording heads, the recording heads ejecting the inks onto a recording medium to record an image, said method comprising the steps of:

storing printing data and non-printing data of each of said different color inks in a storage means;

detecting a boundary between one type of said different color inks and remaining types of said different color inks other than the one type in accordance with the printing data stored in said storage means; and thinning the image by converting some of said printing data of said one type of said different color of inks and said remaining types of said different color inks at said boundary between said one type of said different color inks and said remaining types of said different color inks into non-printing data.

17. An ink jet recording method as claimed in claim 16, wherein said thinning step converts some of said printing data of said one type of said different color inks and said remaining types of said different color inks to non-printing data so that said one type of said different color inks does not border on said remaining types of said different color inks.

18. An ink jet recording method as claimed in claim 17, wherein said thinning step converts said printing data of said one type of said different color inks and said remaining types of said different color inks at said boundary between said one type of said different color ink and said remaining types of said different color inks to non-printing data alternately.

19. An ink jet recording method as claimed in claim 16, further comprising the step of effecting recording by ejecting the ink from each of the plurality of recording heads in accordance with the printing data.

20. An ink jet recording method as claimed in claim 19, wherein each of the recording heads comprises an electrothermal transducer for supplying thermal energy to the ink, and the recording step includes the step of driving the electrothermal transducer in accordance with the printing data to supply thermal energy to the ink so that bubbles are generated in the ink by the thermal energy so as to eject the ink from the recording head.

21. An ink jet recording method of ejecting different color inks onto a recording medium according to image data to record a color image, said method comprising:

a first step of detecting a boundary between a first color and a second color according to said image data;

a second step of judging whether printing data of said second color continues for plural pixels according to said image data;

a third step of processing said image data to thin printing dots of the second color at said boundary when said printing data of said second color is judged to continue for plural pixels in said second step in accordance with said boundary detected in said first step; and a fourth step of printing said image on the recording medium according to the processed image data by ejecting the first and second color inks.

22. An ink jet recording method as claimed in claim 21, wherein said fourth step includes the step of supplying thermal energy to the ink in accordance with the processed image data so that bubbles are generated in the ink by the thermal energy so as to eject the ink from recording heads.

* * * * *

UNITED STATES PATENT AND TRADEMARK OFFICE
CERTIFICATE OF CORRECTION

PATENT NO. : 5,907,332  
DATED : May 25, 1999  
INVENTOR(S) : FUJITA ET AL.

It is certified that error appears in the above-indentified patent and that said Letters Patent is hereby corrected as shown below:

Title page, item  
[57] ABSTRACT:  
    Line 10, "and" and "an adjusting" should be deleted.  
    Line 15, "means" should read --device--.

COLUMN 1:  
    Line 45, "cause" should read --causes--.

COLUMN 4:  
    Line 16, "present-invention," should read --present invention,--.

COLUMN 5:  
    Line 6, "views" should read --view--.  
    Line 65, "of" should be deleted.

COLUMN 6:  
    Line 14, "jet." should read --jet--.

COLUMN 9:  
    Line 30, "a" should be deleted.  
    Line 59, "scanning" should be deleted.

UNITED STATES PATENT AND TRADEMARK OFFICE
CERTIFICATE OF CORRECTION

PATENT NO. : 5,907,332
DATED : May 25, 1999
INVENTOR(S) : FUJITA ET AL.

It is certified that error appears in the above-indentified patent and that said Letters Patent is hereby corrected as shown below:

COLUMN 12:
    Line 18, "unit" should read --units--.
    Line 49, "localed" should read --located--.

COLUMN 13:
    Line 43, "In" should begin a new paragraph.

COLUMN 14:
    Line 31, "weaken" should read --weakened--.

COLUMN 15:
    Line 5, "electro" should read --electro- --.
    Line 16, "electro thermal" should read --electrothermal--.
    Line 19, "electro thermal" should read --electrothermal--.
    Line 40, "electro" should read --electro- --.
    Line 46, "electro thermal" should read --electrothermal--.
    Line 47, "electro thermal" should read --electrothermal--.

UNITED STATES PATENT AND TRADEMARK OFFICE
CERTIFICATE OF CORRECTION

PATENT NO. : 5,907,332
DATED : May 25, 1999
INVENTOR(S) : FUJITA ET AL.

It is certified that error appears in the above-indentified patent and that said Letters Patent is hereby corrected as shown below:

COLUMN 16:
    Line 7, "electro thermal" should read --electrothermal--.
    Line 8, "electro thermal" should read --electrothermal--.
    Line 43, "electro thermal" should read --electrothermal--.

Signed and Sealed this

Eighth Day of February, 2000

Attest:

Attesting Officer

Q. TODD DICKINSON

Commissioner of Patents and Trademarks